(12) United States Patent
Nakata

(10) Patent No.: US 8,491,077 B2
(45) Date of Patent: Jul. 23, 2013

(54) PRINTING DEVICE AND PRINTING METHOD

(75) Inventor: Mitsutaka Nakata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 148 days.

(21) Appl. No.: 13/233,677

(22) Filed: Sep. 15, 2011

(65) Prior Publication Data

US 2012/0069072 A1  Mar. 22, 2012

(30) Foreign Application Priority Data

Sep. 16, 2010 (JP) .................... 2010-208123
Sep. 1, 2011 (JP) .................... 2011-191041

(51) Int. Cl.
*B41J 29/38* (2006.01)

(52) U.S. Cl.
USPC ............. 347/11; 347/5; 347/19; 347/49

(58) Field of Classification Search
USPC ........... 347/5, 9, 10, 11, 12, 13, 14, 19, 49, 347/50

See application file for complete search history.

(56) References Cited

U.S. PATENT DOCUMENTS

| 6,116,716 A * | 9/2000 | Tajika et al. ............. 347/19 |
| 7,226,143 B2 * | 6/2007 | Mitsuzawa ............. 347/19 |

FOREIGN PATENT DOCUMENTS

| JP | 2002-254763 | 9/2002 |
| JP | 2008-183884 | 8/2008 |

* cited by examiner

*Primary Examiner* — Juanita D Jackson
(74) *Attorney, Agent, or Firm* — Oblon, Spivak, McClelland, Maier & Neustadt, L.L.P.

(57) ABSTRACT

A printing device includes one or more engines that are attachable to and detachable from the printing device and print an image on a recording medium. Each engine includes a plurality of head modules each having a plurality of heads that eject ink, one or more data transfer control units that control an image data, pixel by pixel, the image data being subjected to print and being transferred from an upper level device, and an output control unit that requests the data transfer control unit to transfer the image data in a pixel order in accordance with an ink ejection order determined by the engine mounted on the printing device, transfers the image data having been transferred in the pixel order to the head module, in the same pixel order, that is subjected to eject ink, and make the head module eject the ink onto the recording medium.

5 Claims, 31 Drawing Sheets (TO IMAGE OUTPUT UNIT)

FIG.13

| No | CLASSIFICATION | NAME | DIRECTION (DFE ⇔ PCTL) | CONTENTS |
|---|---|---|---|---|
| 1 | JOB INFORMATION | JOB START | ⇔ | NOTIFICATION OF JOB START / RESPONSE JOB IDENTIFIER (JOBID) COMMUNICATION |
| 2 | | JOB END | ⇔ | NOTIFICATION OF END OF ALL OF PRINTING PROCESSES REQUESTED BY CORRESPONDING JOB / RESPONSE JOB IDENTIFIER (JOBID) COMMUNICATION |
| 3 | | PRINTING PROCESS RECEPTION START | ↓ | NOTIFY THAT PRINTER CAN RECEIVE PRINTING PROCESS |
| 4 | | PRINTER INFORMATION REQUEST/ NOTIFICATION | ⇔ | NEEDED PRINTER INFORMATION REQUEST / NOTIFICATION |
| 5 | | PRINTING PROCESS START | ⇔ | NOTIFY THAT IMAGE DATA IS PREPARED / RESPONSE OUTPUT ORDER, PAGE (PROCESS) UNIT |
| 6 | PRINTER STATE/ PRINTING PROCESS | PRINTING PROCESS REQUEST | ⇔ | REQUEST PRINTING PROCESS BY PRINTER CONTROLLER / RESPONSE COLOR, PROCESS IDENTIFICATION NUMBER, PLANE IDENTIFICATION NUMBER PLANE UNIT, REQUEST IN REQUEST ORDER OF ENGINE ※BITMAP IS TAKEN FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINTING PROCESS COMPLETION | ↑ | COMPLETE PRINTING REQUEST FOR ALL PAGES (PROCESSES) |
| 10 | | PROCESS STATE REPORT | ↓ | NOTIFY PRINTING STATE OF PROCESS ・FEEDING ・DISCHARGING ・PRINTING START |
| 11 | | SC NOTIFICATION ERROR GENERATION/RELEASE | ⇔ ↑ | ACQUIRE/NOTIFY OBSTACLE INFORMATION OF PRINTER NOTIFY OBSTACLE GENERATION/RELEASE OF UPPER LEVEL DEVICE |
| 12 | PRINTING CONDITIONS | PRINTING CONDITION SETTING | ⇔ | PRINTING CONDITION NOTIFICATION/RESPONSE ・PRINTING FORM (BOTH-SIDED PRINTING/SINGLE-SIDED PRINTING) ・PRINTING TYPE (DATA EXISTS/BLANK PAGE) ・FEEDING/DISCHARGING INFORMATION (FEEDING ORIGIN, DISCHARGING DESTINATION) ・PRINTING SURFACE ORDER (SURFACE → BACK SURFACE/ BACK SURFACE → SURFACE) ・PRINTING PAPER SIZE ・PRINT DATA SIZE ・RESOLUTION, GRADATION ・COLOR INFORMATION ETC. |
| 13 | CONNECTION | REGISTRATION/RELEASE | ⇔ | MUTUAL REGISTRATION OF UPPER LEVEL DEVICE AND PRINTER CONTROLLER |

FIG. 25

| No. | DATA TRANSFER CONTROL UNIT | CONTENTS | | SETTING CONTENTS |
|---|---|---|---|---|
| 1 | COMMON | PBID | | PAGE IDENTIFIER |
| 2 | | DATA AMOUNT FOR EACH PAGE | | NUMBER OF COLORS (MONOCHROME: 1, FULL COLOR: 4) |
| 3 | | FOR PRINTING | | |
| 4 | | RESOLUTION | | MAIN SCANNING: PRINTING RESOLUTION |
| 5 | | | | SUB-SCANNING: PRINTING RESOLUTION |
| 6 | | GRADATION | | NUMBER OF BITS FOR EACH PIXEL |
| 7 | | PAPER FEEDING LENGTH | | NUMBER OF DOTS OF PAPER FEEDING DIRECTION |
| 8 | | PAPER WIDTH | | NUMBER OF DOTS OF PAPER WIDTH DIRECTION |
| 9 | | PRINTING SURFACE (SURFACE/BACK SURFACE) | | PRINTING SURFACE |
| 10 | 1 | Color IDENTIFIER | | C/M/Y/K |
| 11 | | FOR DATA TRANSFER | | |
| 12 | | DATA TRANSFER NECESSITY/NON-NECESSITY | | SET DATA TRANSFER OF ALL COLORS TO "NON-NECESSITY" IN CASE OF WHITE PAGE |
| 13 | | DATA TRANSFER ORIGIN ADDRESS | | |
| 14 | | DATA STORAGE DESTINATION ADDRESS | | |
| 15 | | DATA TRANSFER SIZE | | BYTE SIZE INCLUDING BOUNDARY ADJUSTMENT SIZE |
| 16 | | FOR PRINTING | | |
| 17 | | PRINTING NECESSITY/NON-NECESSITY | | SET PRINTING OF ALL COLORS TO "NON-NECESSITY" IN CASE OF WHITE PAGE |
| 18 | | UPPER SIDE ON PRINTING PROHIBITED AREA | | PRINTING PROHIBITED AREA OF UPPER SIDE OF PAPER |
| 19 | | LOWER SIDE ON PRINTING PROHIBITED AREA | | PRINTING PROHIBITED AREA OF LOWER SIDE OF PAPER |
| 20 | | LEFT SIDE ON PRINTING PROHIBITED AREA | | PRINTING PROHIBITED AREA OF LEFT SIDE OF PAPER |
| 21 | | RIGHT SIDE ON PRINTING PROHIBITED AREA | | PRINTING PROHIBITED AREA OF RIGHT SIDE OF PAPER |
| 22 | | IMAGE INFORMATION | | |
| 23 | | | X DIRECTION EFFECTIVE SIZE | NUMBER OF EFFECTIVE DOTS IN MAIN SCANNING DIRECTION THAT DOES NOT INCLUDE BOUNDARY ALIGNMENT |
| 24 | | | Y DIRECTION EFFECTIVE SIZE | NUMBER OF EFFECTIVE DOTS IN SUB-SCANNING DIRECTION THAT DOES NOT INCLUDE BOUNDARY ALIGNMENT |
| 25 | 2 | EQUAL TO DATA TRANSFER CONTROL UNIT 1 EXCEPT COLOR IDENTIFIER | | |
| 26 | 3 | EQUAL TO DATA TRANSFER CONTROL UNIT 1 EXCEPT COLOR IDENTIFIER | | |
| 27 | 4 | EQUAL TO DATA TRANSFER CONTROL UNIT 1 EXCEPT COLOR IDENTIFIER | | |

PRINTING DEVICE AND PRINTING METHOD

CROSS-REFERENCE TO RELATED APPLICATIONS

The present application claims priority to and incorporates by reference the entire contents of Japanese Patent Application No. 2010-208123 filed in Japan on Sep. 16, 2010 and Japanese Patent Application No. 2011-191041 filed in Japan on Sep. 1, 2011.

BACKGROUND OF THE INVENTION

1. Field of the Invention

The present invention relates to a printing device and a printing method.

2. Description of the Related Art

Conventionally, there is known a technology of rearranging image data pixel by pixel in accordance with an ejection order of ink from a head, for the purpose of improving the print speed control in an ink jet printing device (e.g. see Japanese Patent Application Laid-open No. 2008-183884).

On the other hand, in the printing system of recent years, an upper level device for generating the image data may be provided separately from a printing device for printing the image data, so as to shorten the time for generating the image data and thereby improving the print speed. In the printing device of this system, an installation number of printer engines may be changed. In the case of changing the installation number of printer engines, a head from which ink is ejected also changes, and thereby the ejection order of ink also changes.

Therefore, if the technology disclosed by Japanese Patent Application Laid-open No. 2008-183884 is applied to the printing device of this type, there is a need to remake or adapt the printer engines in accordance with the installation number of printer engines. Specifically, there is a need to prepare a printer engine for rearranging the image data in accordance with the ejection order of ink depending on the installation number, for each the installation number of printer engines. Therefore, the scalability is limited.

SUMMARY OF THE INVENTION

It is an object of the present invention to at least partially solve the problems in the conventional technology.

According to an aspect of the present invention, there is provided a printing device including one or more engines that are attachable to and detachable from the printing device and print an image on a recording medium. The engine includes a plurality of head modules having a plurality of heads that eject ink, one or more data transfer control units that control an image data, pixel by pixel, the image data being subjected to print and being transferred from an upper level device via a predetermined path, and an output control unit that requests the data transfer control unit to transfer the image data in a pixel order in accordance with an ink ejection order determined by the engine mounted on the printing device, transfers the image data having been transferred in the pixel order to the head module, in the same pixel order, that is subjected to eject ink from among the plurality of head modules, and make the head module eject the ink onto the recording medium.

According to another aspect of the present invention, there is provided a printing method performed by a printing device, the printing device having one or more engines that are attachable to and detachable from the printing device and print an image on a recording medium, the engines having a plurality of head modules having a plurality of heads that eject ink. The method includes, by said one or more data transfer control units, controlling an image data, pixel by pixel, the image data being subjected to print and being transferred from an upper level device via a predetermined path, and by a control unit, requesting the data transfer control unit to transfer the image data in a pixel order in accordance with an ink ejection order determined by the engine mounted on the printing device, transferring the image data having been transferred in the pixel order to the head module, in the same pixel order, that is subjected to eject ink from among the plurality of head modules, and making the head module eject the ink onto the recording medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic diagram illustrating exemplary control information transmitted and received between the upper level device and the printing device controller of the printing device;

FIG. 25 is a schematic diagram illustrating an exemplary configuration of a transfer management table according to a third embodiment;

DETAILED DESCRIPTION OF THE PREFERRED EMBODIMENTS

Figure 1:
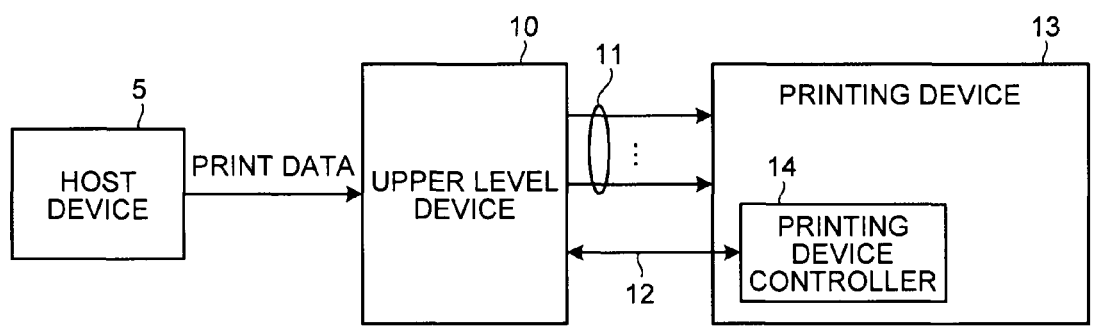
FIG. 1 is a block diagram illustrating an exemplary configuration of a printing system applicable to the first embodiment of the present invention.

Hereinafter, embodiments of a printing device and a printing method according to the present invention will be described in detail with reference to the accompanying drawings. Incidentally, the printing devices in the following embodiments form any image onto a printing sheet by ink jet method.

Furthermore, in any printing device in the following embodiments, the printer engine may be detachable. When mounted on the printing device, the printer engine rearranges the image data pixel by pixel in accordance with the ejection order of ink. The ejection order of ink depends on the installation number of printer engines. Therefore, the printer engines in the following embodiments switches the arrange patterns of image data pixel by pixel in accordance with the ejection order of ink depending on the installation number thereof.

Therefore, in the following embodiments, there is no need to remake or adapt any printer engine in accordance with the installation number thereof. Specifically, there is no need to prepare any printer engine for rearranging the image data in accordance with the installation number thereof for each the installation numbers thereof, for example, to prepare a printer engine for rearranging the image data in accordance with the ejection order of ink in a case that the installation number is one, or to prepare a printer engine for rearranging the image data in accordance with the ejection order of ink in a case that the installation number is four. Thereby, according to the following embodiments, the printing device can be provided with the improved scalability.

In the following first and third embodiments, an explanation will be made on an example in which one printer engine is mounted on the printing device. In the following second embodiment, an explanation will be made on an example in which four printer engines are mounted on the printing device. However, the installation number of printer engines is not limited to these examples.

First, in order to understand well the present invention, a simple explanation will be made on a production printing to which the printing system in the following embodiments is applied. The production printing has a basic concept of producing a large amount of print in a short time period. For this purpose, the production printing needs to improve the printing speed and needs to construct a work flow system for managing a process from generating the image data to distributing the printed matter, in order to realize the efficient job management or the efficient image data management, or the like.

The printing system in the following embodiments relates to a part of performing a printing process in the work flow of the production printing. In that system, RIP (Raster Image Processor) process is performed separately from the printing process of bitmap data obtained by the RIP process. The RIP process takes the longest time in the printing process. Therefore, it is possible to improve the printing speed by separating the device for performing the RIP process from the device for performing the printing process.

First Embodiment

As mentioned above, now the explanation will be made on an example in which one printer engine is mounted on the printing device in the first embodiment.

<Outline of Printing System>

FIG. 1 illustrates an example of the configuration of a printing system applicable to the first embodiment of the present invention. The printing system is provided with an upper level device 10, a printing device 13 as an image forming device, a plurality of data lines 11, and a control line 12. The upper level device 10 is connected with the printing device 13 via the plurality of data lines 11 and the control line 12. A host device 5 may be a computer for example to generate print job data including print image data and print set information.

The print job data may include data written in PDL (Page Description Language) (hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown) of the printing device 13 through the plurality of data lines 11. Between the upper level device 10 and a printing device controller 14, the control information for controlling the print operation is transmitted/received through the control line 12. The printing device controller 14 controls the printer engine unit on the basis of the transmitted/received control information to form an image on a print medium, thereby perform the print operation according to the print job. Incidentally, the specific example of the control information will be described later with reference to FIGS. 16 to 18.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper sheet. That is, other printing media may be used, so long as the media capable of being printed by the printing system applicable to each embodiment, and capable of being supplied in a form of roll. For example, plastic films, cloths and so on may be used as the printing media.

<Upper Level Device>

Figure 2:
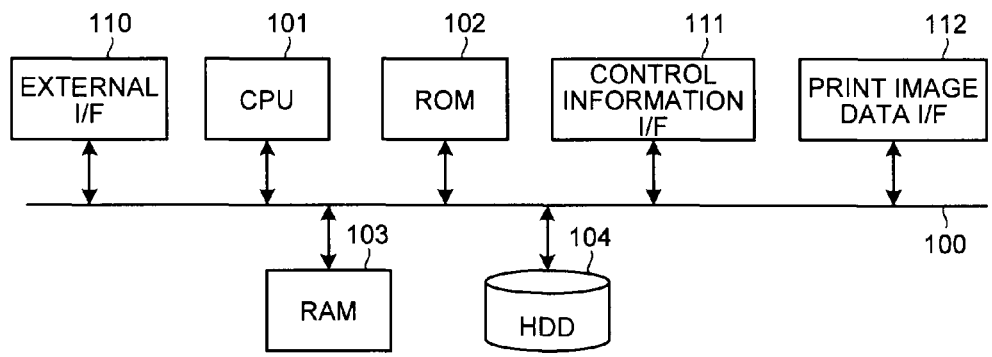
FIG. 2 is a block diagram illustrating an exemplary configuration of an upper level device.

FIG. 2 illustrates an example of the configuration of the upper level device 10. A control processing unit (CPU) 101, a read only memory (ROM) 102, a random access memory (RAM) 103, and a hard disk drive (HDD) 104 are connected to a bus 100. An external I/F 110, a control information I/F 111, and a print image data I/F 112 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transmission speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printing device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printing device 13. The CPU 101 transmits/receives control information to control printing through the control information I/F 111 between the CPU 101 and the printing device 13, according to a progress situation of the print operation.

Figure 3:
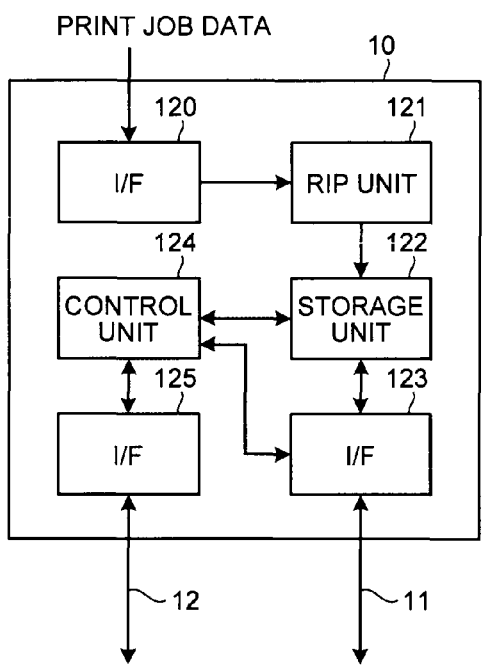
FIG. 3 is a functional block diagram illustrating an exemplary function of the upper level device.

FIG. 3 is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111, respectively. The RIP unit 121 and the control unit 124 are configured by a program operating on the CPU 101 in FIG. 2. The storage unit 122 corresponds to at least one of the RAM 103 or the HDD 104 in FIG. 2.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printing device controller 14 of the printing device 13 through the interface 125. For example, the control unit 124 generates control information to control printing in the printing device 13, on the basis of the print job data supplied from the host device 5 through the interface 120. The control information is transmitted from the control unit 124 to the printing device controller 14 through the interface 125.

The interface 123 is configured to have independent access to the print image data of each color of Y, C, M, and K stored in the storage unit 122. The interface 123 is connected to the printing device 13 through the plurality of data lines 11 corresponding to the individual colors of Y, C, M, and K, and exchanges control information related to print image data transfer of each color of Y, C, M, and K between the interface 123 and the printing device 13 or transmits print image data of each color of Y, C, M, and K.

<Printing Device>

Figure 4:
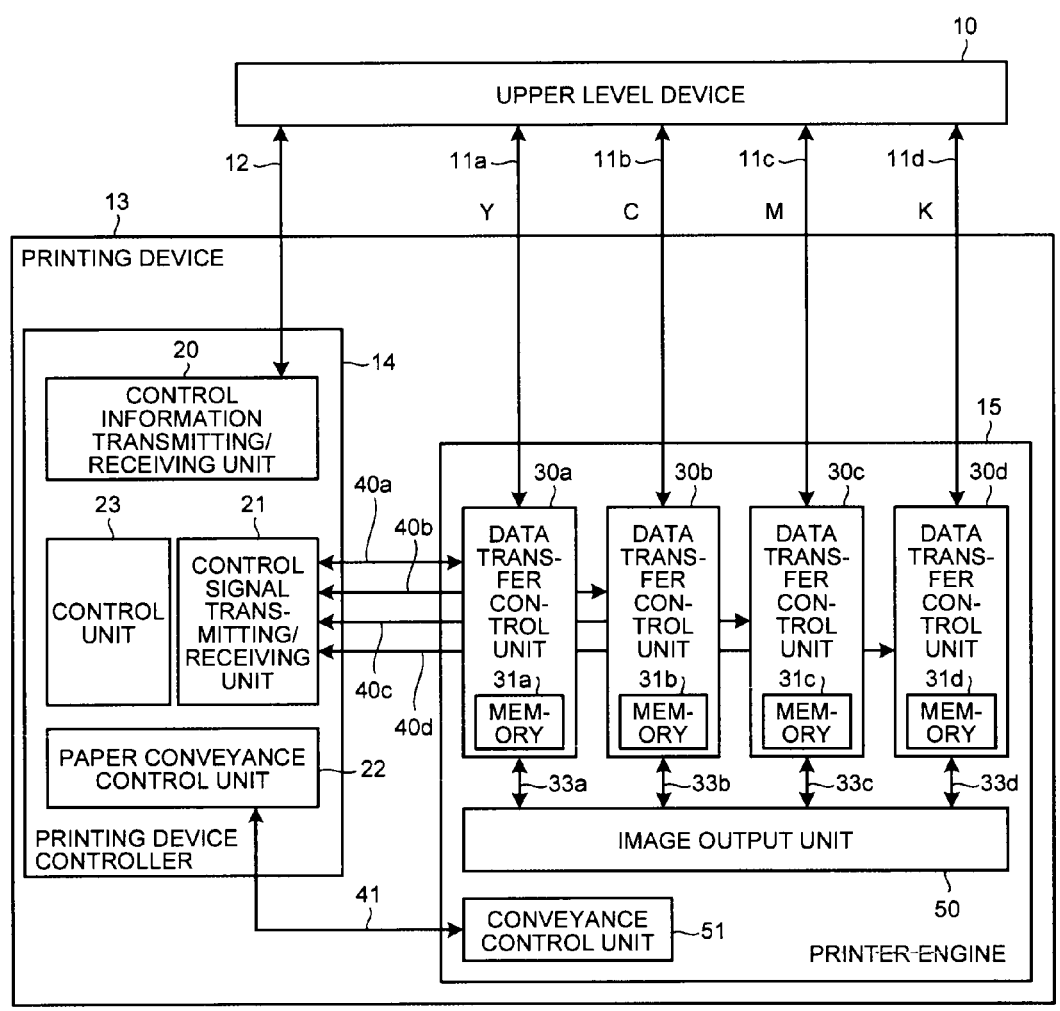
FIG. 4 is a block diagram illustrating an exemplary configuration of a printing device.

FIG. 4 illustrates an example of the configuration of the printing device 13. The printing device 13 includes a printing device controller 14 and a printer engine 15. The printing device controller 14 is connected to the control line 12, and exchanges control information with the upper level device 10 through the control line 12 to control a print operation. The printer engine 15 is connected to the plurality of data lines 11a, 11b, 11c, and 11d and executes a printing process of print image data of each color that is transmitted from the upper level device 10 through the data lines 11a, 11b, 11c, and 11d according to the control of the printing device controller 14.

The printing device controller 14 and the printer engine 15 will be described in more detail. The printing device controller 14 includes a control information transmitting/receiving unit 20, a control signal transmitting/receiving unit 21, a paper conveyance control unit 22, and a control unit 23.

The control information transmitting/receiving unit 20 exchanges control information to control the printing with the upper level device 10 through the control line 12. The control signal transmitting/receiving unit 21 is connected to data transfer control units 30a, 30b, 30c, and 30d to be described below through engine I/F control lines 40a, 40b, 40c, and 40d. The control signal transmitting/receiving unit 21 exchanges a control signal respectively with the data transfer control units 30a, 30b, 30c, and 30d. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printing device controller 14 according to a program previously stored in the ROM. The control unit 23 analyzes the control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 5:
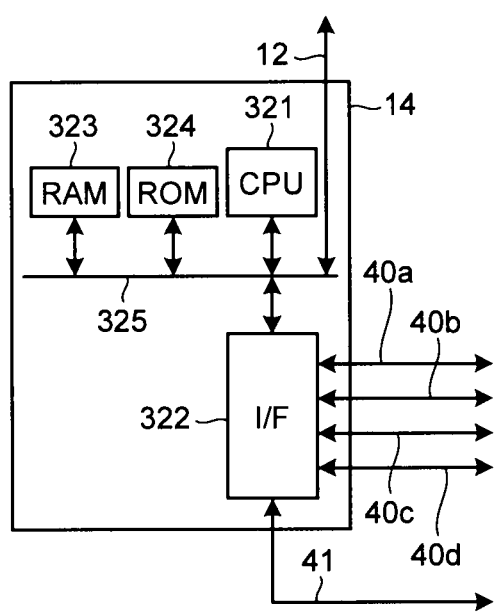
FIG. 5 is a block diagram illustrating an exemplary configuration of a printing device controller.

FIG. 5 illustrates an example of the hardware configuration of the printing device controller 14. The printing device controller 14 includes a CPU 321, an interface (I/F) 322, a RAM 323, and a ROM 324. The CPU 321, the interface (I/F) 322, the RAM 323, and the ROM 324 are connected to a bus 325 such that they can communicate with each other. To the bus 325, a control line 12 is also connected through a communication I/F not illustrated in the drawings. The CPU 321 operates using the RAM 323 as the work memory according to the program stored in the ROM 324 and controls all the operations of the printing device 13. The interface 322 includes a logic circuit that is configured in a hardware manner and controls communication with a printing device controller 14, data transfer control units 30a, 30b, 30c, and 30d and a conveyance control unit 51.

In this configuration, for example, functions of the control signal transmitting/receiving unit 21 and the paper conveyance control unit 22 illustrated in FIG. 4 are realized by the I/F 322. The function of the control unit 23 is realized by the program operated on the CPU 321. The function of the control information transmitting/receiving unit 20 is realized by a communication I/F not illustrated in the drawings and the bus 325.

Returning to the description of FIG. 4, the printer engine 15 includes the plurality of data transfer control units 30a, 30b, 30c, and 30d that have the same configuration, an image output unit 50 that outputs an image based on the print image data to paper and forms an image, and a conveyance control unit 51 that controls conveyance of printing paper.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively. The data transfer control units 30a to 30d store the print image data of the individual colors transferred from the upper level device 10 through the data lines 11a, 11b, 11c, and 11d in the memories 31a, 31b, 31c, and 31d, after converting the transferred data into multivalued data or binary data in accordance with the specification of the head. The data lines 11a, 11b, 11c, and 11d correspond to color Y, C, M, and K, respectively. However, the relationship between the data lines 11a to 11b and respective colors is not limited to this example The data transfer control units 30a to 30d control the image data pixel by pixel stored in the memories 31a to 31d, respectively. Each of data transfer control units 30a to 30d also sends a memory storage report to an output control unit 55 (described later with reference to FIG. 8) of the image output unit 50 through the data lines 33a to 33d, respectively. Once each of data transfer control units 30a to 30d receives from the output control unit 55 a request of image data transfer with a pixel sequence in accordance with the ejection order of ink, each of the data transfer control units 30a to 30d transfers the image data to the output control unit 55 with the pixel sequence corresponding to the request. Incidentally, each of data transfer control units 30a to 30d may erase the image data stored in respective memories 31a to 31d, after the image data transfer. The timing of erasing the data may be any timing, such as a timing after the data transfer corresponding to one dot, a timing after the data transfer corresponding to one ejection, a timing after the data transfer corresponding to one raster, and so on.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The data transfer control units 30a, 30b, 30c, and 30d are connected to the control signal transmitting/receiving unit 21 through engine I/F control lines 40a, 40b, 40c, and 40d, respectively. The control signal transmitting/receiving unit 21 can transmit/receive a control signal to/from the data transfer control units 30a, 30b, 30c, and 30d through the engine I/F control lines 40a, 40b, 40c, and 40d, respectively.

Figure 6:
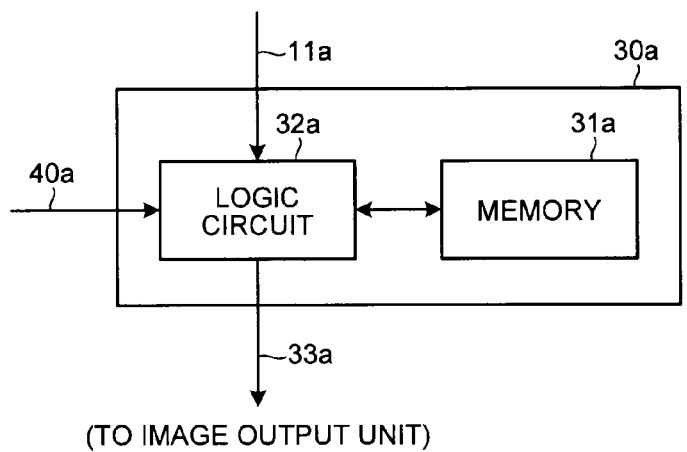
FIG. 6 is a block diagram schematically illustrating an exemplary configuration of a data transfer control unit.

FIG. 6 schematically illustrates an example of the configuration of the data transfer control unit 30a. Since the common configuration is applied to the data transfer control units 30a, 30b, 30c, and 30d, the configuration of the data transfer control unit 30a from among the data transfer control units 30a, 30b, 30c, and 30d is illustrated representatively in FIG. 6.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to an image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a software manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 7:
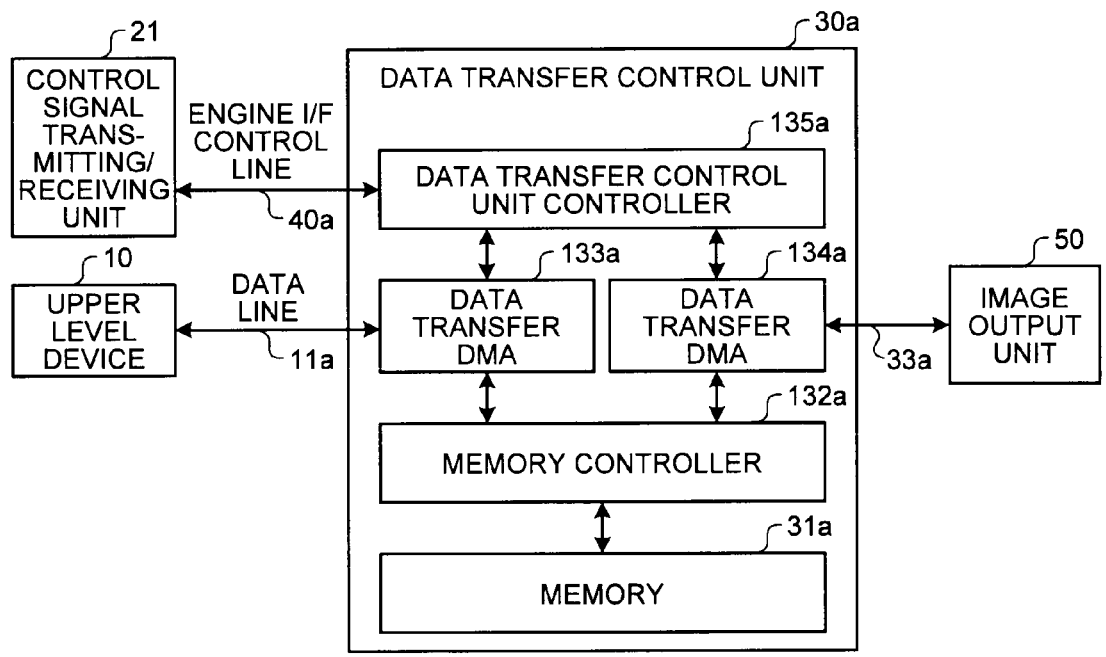
FIG. 7 is a block diagram specifically illustrating an exemplary configuration of the data transfer control unit.

FIG. 7 specifically illustrates an example of the configuration of the data transfer control unit 30a. In FIG. 7, components that are common to those of FIG. 6 are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 6.

The memory controller 132a controls access with respect to the memory 31a. The data transfer DMA 133a receives print image data from the upper level device 10 and writes the print image data in the memory through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printing device controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133a and is written at a predetermined address of the memory 31a through the memory controller 132a.

Once the printing instruction that is transmitted from the control signal transmitting/receiving unit 21 is received in the data transfer control unit controller 135a through the engine I/F control line 40a, the data transfer control unit controller 135a instructs the data transfer DMA 134a to read data from the memory 31a. The data transfer DMA 134a reads data from the memory 31a through the memory controller 132a, according to the instruction. The data transfer DMA 134a transmits the read data to the image output unit 50 through the output line 33a.

Figure 8:
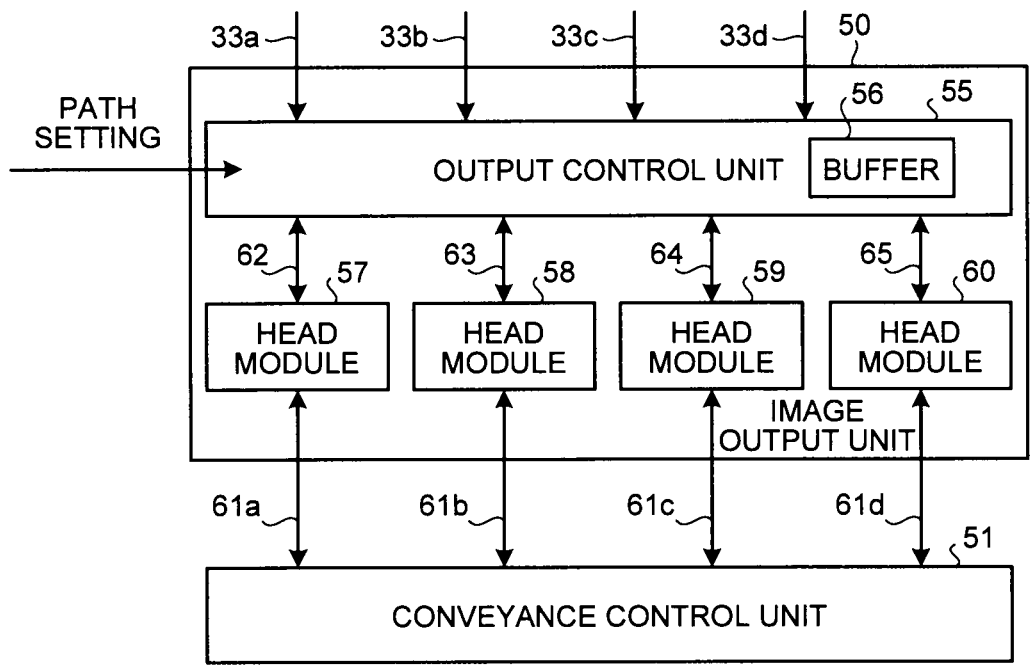
FIG. 8 is a block diagram illustrating an exemplary configuration of an image output unit.

FIG. 8 illustrates an example of the configuration of the image output unit 50. The image output unit 50 includes an output control unit 55 and head modules 57, 58, 59, and 60 for colors Y, C, M, and K. The output control unit 55 is provided with a buffer 56 for storing temporarily the print image data received from the data transfer control unit 30.

In the case that one printer engine is mounted on the printing device 13 as in the first embodiment, the printer engine may have four data transfer control units and four head modules. Furthermore, each of four data transfer control units and each of four head modules are in one-to-one relationship, respectively. However, the printer engine configuration in the case that one printer engine is mounted on the printing device 13 is not limited to this. Incidentally, the number of head modules and the number of data transfer control units in the printer engine 15 may be changed.

Incidentally, the relationship between the head modules 57 to 60 and respective colors are not limited to this example. The output control unit 55 controls the connection between the head modules 57 to 60 and output lines 33a to 33d to which the print image data is output from the data transfer control units 30a to 30d, respectively. That is, the output control unit 55 can set a path so that respective head modules 57 to 60 select one of output lines 33a to 33d to connect with the same, respectively.

For example, in this embodiment, the output control unit 55 sets the path so that respective head modules 57 to 60 are in one-to-one relationship with respective output lines 33a to 33d. Alternatively, the output control unit 55 may set the path so that the relationship between the head modules 57 to 60 and the output lines 33a to 33d is in one-to-many relationship, such as a case that the output line 33a connects with all of respective head modules 57 to 60.

The path for connecting respective output lines 33a to 33d with respective head modules 57 to 60 may be set by user operation with a dip switch or the like. Without limiting to this, the path may be set by any control signal from the control signal transmitting/receiving unit 21.

The head modules 57 to 60, which are connected to the output control unit 55 through data lines 62 to 65 respectively, have a plurality of heads for ejecting ink, respectively. In this context, the "head" means a block having rows of ink nozzles. The "head module" is composed of a plurality of "heads" disposed so that a length corresponding to one raster can be printed. The head modules 57 to 60 request the output control unit 55 to transfer the ejection data in accordance with the ejection trigger signal from a conveyance control unit 51 to be described later, respectively. And, the head modules 57 to 60 cause the corresponding head to eject ink on the basis of the transferred ejection data. In this context, the "ejection trigger signal" may be SYNC signal for example and may be assorted at every raster. The "ejection data" means multivalued or binary data indicating ink density. Incidentally, the head modules 57 to 60 connect with the conveyance control unit 51 through control lines 61a to 61d, respectively.

As described above, in the printing device 13 according to each embodiment, the print image data is transferred from the upper level device 10 through a path deferent from a path for transmitting/receiving the control signal for controlling the printing process using the print image data to/from the upper level device 10. The print image data of the individual colors is transferred from the upper level device 10 through the different data lines 11a, 11b, 11c, and 11d and the print image data of the individual colors that is transferred through the data lines 11a, 11b, 11c, and 11d is independently controlled and is supplied to the data transfer control units 30a, 30b, 30c, and 30d that have the same configuration. Further, in the image output unit 50, connection paths of outputs of the data transfer control units 30a, 30b, 30c, and 30d and the head modules 57, 58, 59, and 60 of the individual colors can be set by a user operation or the like.

Therefore, the printing device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30a, 30b, 30c, and 30d according to the required configuration.

For example, in a case of performing a full-color printing with four colors Y, C, M, and K, all of the data transfer control units 30a, 30b, 30c, and 30d may be provided in the printer engine 15. In the output control unit 55, the outputs of the data transfer control units 30a, 30b, 30c, and 30d may be connected to the head modules 57, 58, 59, and 60, respectively. For example, in a case of performing a mono-color printing with only color K, it may be configured from a cost viewpoint that only the data transfer control unit 30a is provided with only the head module 57. And, in the output control unit 55, the output of the data transfer control unit 30a can be connected to the head module 57. Alternatively, in the case of performing the mono-color printing with the only color K, it may be configured form a speed viewpoint that only the data transfer control unit 30a is provided with four head modules 57, 58, 59, and 60. And, in the output control unit 55, the output of the data transfer control unit 30a can be connected to four head modules 57, 58, 59, and 60. In this case, the same color is printed overlappingly a plurality of times. Therefore, for example, a high speed printing may be realized by shortening the ejection time of ink from head modules 57, 58, 59, and 60 respectively to ¼ of the usual ejection time and increasing the conveyance speed of sheet paper to quadruple of the usual conveyance speed.

Referring to FIG. 4, the conveyance control unit 51 is connected to the paper conveyance control unit 22 by the conveyance control line 41 and controls conveyance of paper to which an image is formed on the basis of the image data by the head modules 57 to 60.

Figure 9:
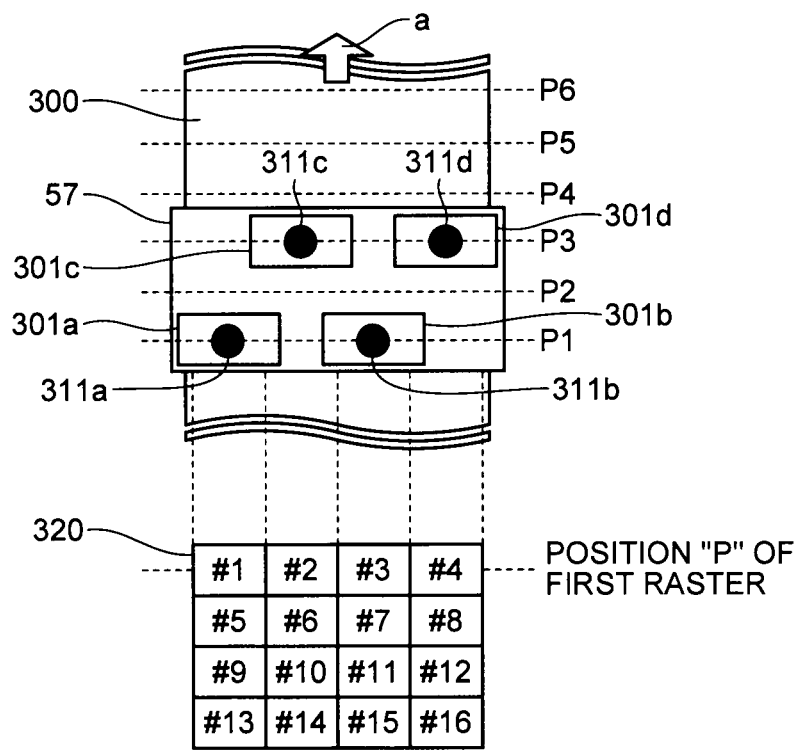
FIG. 9 is a schematic diagram illustrating a relationship between a head module according to the first embodiment and the image data corresponding to one page to be printed.
Figure 10:
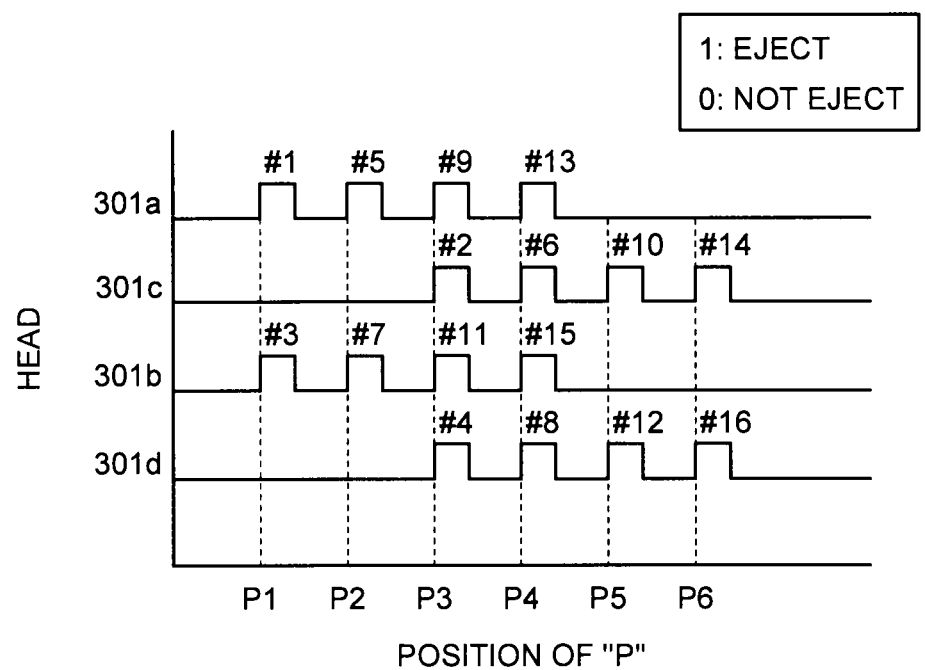
FIG. 10 is a timing chart illustrating an exemplary timing of ejecting ink from the head module according to the first embodiment.

FIG. 9 illustrates an exemplary relationship between the head module 57 and the image data 320 corresponding to one page to be printed according to the first embodiment. FIG. 10 illustrates an exemplary timing of ejecting ink from the head module 57. Incidentally, the content of FIG. 9 and FIG. 10 (especially, the head module configuration and the image data configuration of one page) is simplified for the explanation. Therefore, these configurations are not limited to these examples. Furthermore, the explanation for FIG. 9 and FIG. 10 can be applied also to the head modules 58, 59, and 60. Therefore, the further explanation for the head modules 58, 59, and 60 is omitted.

In the example shown in FIG. 9, the head module 57 includes heads 301a, 301b, 301c, and 301d. The heads 301a to 301d have nozzles 311a to 311d each of which is a hole provided at the center of each head, respectively. Respective heads 301a to 301d can form one pixel on the printing paper 300 by ejecting ink once from respective nozzles 311a to 311d.

The image data 320 corresponding to one page to be printed at a predetermined position on the printing paper 300 is data made of 4×4 pixels. The pixels #1, #2, #3, and #4 of the image data 320 are defined as the first raster. The position on the printing paper 300 where the pixels #1, #2, #3, and #4 as the first raster are printed is defined as "P". The pixels #5, #6, #7, and #8 of the image data 320 is defined as the second raster. The pixels #9, #10, #11, and #12 of the image data 320 is defined as the third raster. The pixels #12, #13, #14, and #16 of the image data 320 is defined as the fourth raster.

The denotations P1 to P6 indicate the positions of P moving toward a direction indicated by an arrow "a" when the printing paper 300 is conveyed towards the direction "a" by the conveyance control unit 51. At the positions P1 to P6, the ink is ejected at least from any of heads 301a to 301d. The interval among P1 to P6 is arranged to be the minimum interval capable of ejecting ink accurately and thereby printing the image accurately at the corresponding conveyance speed when the conveyance speed of the printing paper 300 is constant. Thereby, respective intervals from P1 to P6 are equal to each other.

In the timing chart shown as FIG. 10, the vertical axis refers to respective heads 301a to 301d, and the horizontal axis refers to the position of P when located at P1 to P6. The ejection timings from respective heads 301a to 301d when P is located at P1 to P6 are represented as square waves.

Specifically, when P is located at P1, the head 301a and the head 301b overlap with the pixel #1 and the pixel #3 of the first raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*a*, 301*b* which are the first ejection data (P=P1). The head module 57 causes the heads 301*a*, 301*b* to eject ink on the basis of the ejection data transferred from the output control unit 55 (see FIG. 10). Incidentally, the ejection data transferred from the output control unit 55 at this time are the pixels #1, #3.

Subsequently, when P is located at P2, the heads 301*a*, 301*b* overlap with the pixels #5, #7 of the second raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*a*, 301*b* which are the second ejection data (P=P2). The head module 57 causes the heads 301*a*, 301*b* to eject ink on the basis of the ejection data transferred from the output control unit 55 (see FIG. 10). Incidentally, the ejection data transferred from the output control unit 55 at this time are the pixels #5, #7.

Subsequently, when P is located at P3, the heads 301*c*, 301*d* overlap with the pixels #2, #4 of the first raster, respectively, and the heads 301*a*, 301*b* overlap with the pixels #9, #11 of the third raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*a*, 301*b*, 301*c*, and 301*d* which are the third ejection data (P=P3). The head module 57 causes the heads 301*a*, 301*b*, 301*c*, and 301*d* to eject ink on the basis of the ejection data transferred from the output control unit 55 (see FIG. 10). Incidentally, the ejection data transferred from the output control unit 55 at this time are the pixels #9, #2, #11, and #4.

Subsequently, when P is located at P4, the heads 301*c*, 301*d* overlap with the pixels #6, #8 of the second raster, respectively, and the heads 301*a*, 301*b* overlap with the pixels #13, #15 of the fourth raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*a*, 301*b*, 301*c*, and 301*d* which are the fourth ejection data (P=P4). The head module 57 causes the heads 301*a*, 301*b*, 301*c*, and 301*d* to eject ink on the basis of the ejection data transferred from the output control unit 55 (see FIG. 10). Incidentally, the ejection data transferred from the output control unit 55 at this time are the pixels #13, #6, #15, and #8.

Subsequently, when P is located at P5, the heads 301*c*, 301*d* overlap with the pixels #10, #12 of the third raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*c*, 301*d* which are the fifth ejection data (P=P5). The head module 57 causes the heads 301*c*, 301*d* to eject ink on the basis of the ejection data transferred from the output control unit 55 (see FIG. 10). Incidentally, the ejection data transferred from the output control unit 55 at this time are the pixels #10, #12.

Subsequently, when P is located at P6, the heads 301*c*, 301*d* overlap with the pixels #14, #16 of the fourth raster, respectively (see FIG. 9). This timing is the ejection timing, and the conveyance control unit 51 sends the ejection trigger signal to the head module 57. Thereby, the head module 57 requests the output control unit 55 to transfer the ejection data of the heads 301*c*, 301*d* which are the sixth data (P=P6). The head module 57 causes the heads 301*c*, 301*d* to eject ink on the basis of the ejection data transferred from the output control unit 55 (see FIG. 10). Incidentally, the ejection data transferred from the output control unit 55 at this time are the pixels #14, #16.

The output control unit 55, to which the data lines 32*a* to 32*d* and the data lines 62, 63, 64, 65 are connected, has a buffer 56. The output control unit 55 requests the corresponding data transfer control unit from among the data transfer control units 30*a* to 30*d* to transfer the image data in the pixel order in accordance with the ink ejection order determined depending on the installation number of printer engines mounted on the printing device 13. Then, the output control unit 55 transfers the image data, which have been transferred in the requested pixel order, in the corresponding pixel order to the corresponding head modules from among the head modules 57, 58, 59, and 60 to eject ink on the printing paper.

Specifically, when received the memory storage report from any of the data transfer control units 30*a* to 30*d*, the output control unit 55 requests the data transfer control units, from which the report was sent, to transfer the image data in the pixel order in accordance with the ink ejection order determined depending on the installation number of the printer engines 15, and stores the pixels, transferred in the requested pixel order, sequentially into the buffer 56. Then, in response to the transfer request from the corresponding head module(s) from among the head modules 57, 58, 59, and 60, the output control unit 55 transfers the image data stored in the buffer 56 to the corresponding head module(s), in the pixel order transferred from the data transfer control units. The pixel-based position information of the image data may be designated by the memory storage report as mentioned above, or may be designated by the transfer management table in the following third embodiment.

Incidentally, the output control unit 55 is realized by FPGA (Field Programmable Gate Array). The circuit configuration of the FPGA is switchable to the circuit configuration corresponding to the installation number of printer engines. Specifically, in the first embodiment, the circuit configuration of the FPGA is the circuit configuration corresponding to the case that the installation number of printer engine is one.

In this case, the output control unit 55 sets the connection such that the data lines 32*a* to 32*d* are connected with the head modules 57 to 60 corresponding to colors C, M, Y, and K in one-to-one relationship. Thereby, the data transfer control units 30*a* to 30*d* correspond to the head modules 57 to 60, one-to-one, respectively. Also in this case, the output control unit 55 sets the ink ejection order such that the ink ejection is performed by one head module for one color, as the ink ejection order in the case that the installation number of the printer engine is one. Incidentally, whatever image data is to be printed, the ink ejection order from the head module is the same, so long as the shape of heads of the head module and the shape of nozzles of the corresponding head are the same. Therefore, the ink ejection order can be patterned, if the head module used for one color is determined.

Incidentally, the circuit configuration of the FPGA is switched on the basis of the user operation with the dip switch or the like. However, without limiting to this, the circuit configuration may be switched on the basis of the control signal (not shown) from the control unit 23 of the printing device controller 14.

FIGS. 11A to 11F illustrate an exemplary transfer order of the image data in the first embodiment. These figures illustrate the transfer order for causing the head module 57 to eject ink in the ink ejection order as explained with FIG. 9 and FIG.

10. Incidentally, the contents illustrated in FIGS. 11A to 11F are simplified for the explanation. Therefore, the transfer order is not limited to this example. Herein, as shown in FIGS. 11A to 11F, the pixels #1 to #16 composing the image data 320 (see FIG. 9) are stored in the memory 31a. Also in the example shown in FIGS. 11A to 11F, the ink ejection order illustrated by the timing chart of FIG. 10 is set to the output control unit 55 as the ink ejection order in the case that the installation number of the printer engine is one.

Figure 11A:
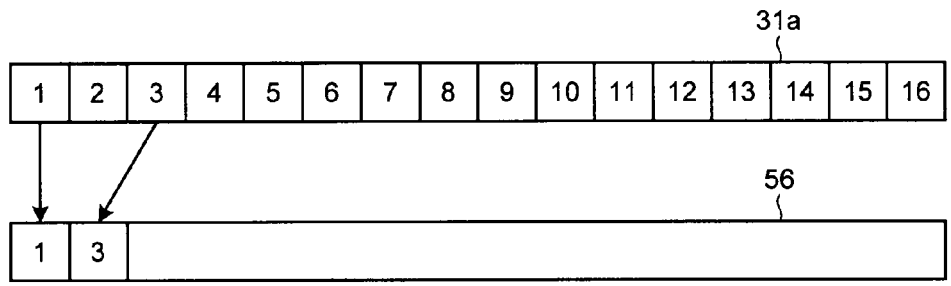
FIG. 11A is a diagram illustrating an exemplary transfer sequence of the image data according to the first embodiment.

In this case, firstly, the output control unit 55 requests the data transfer control unit 30a to transfer the pixels #1, #3, for which the ink is ejected at the timing when P is located P1 (see FIG. 10), and stores into the buffer 56 the pixels #1, #3, which the data transfer control unit 30a read out from the memory 31a and transferred to the control unit 55, as shown in FIG. 11A. In a case that a plurality of pixels are requested to be transferred at one time, the output control unit 55 requests to transfer the pixels in the order from the pixel for which ink is ejected by the head 301a, the pixel for which ink is ejected by the head 301b, the pixel for which ink is ejected by the head 301c, and the pixel for which ink is ejected by the head 301c. And, the pixels are transferred in accordance with this order.

Figure 11B:
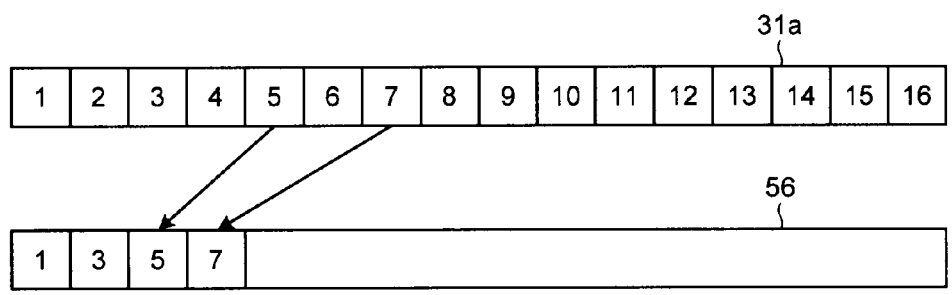
FIG. 11B is a diagram illustrating an exemplary transfer sequence of the image data according to the first embodiment.

Subsequently, the output control unit 55 requests the data transfer control unit 30a to transfer the pixels #5, #7 for which the ink is ejected at the timing when P is located P2 (see FIG. 10), and stores into the buffer 56 the pixels #5, #9, which the data transfer control unit 30a read out from the memory 31a and transferred to the control unit 55, as shown in FIG. 11B.

Figure 11C:
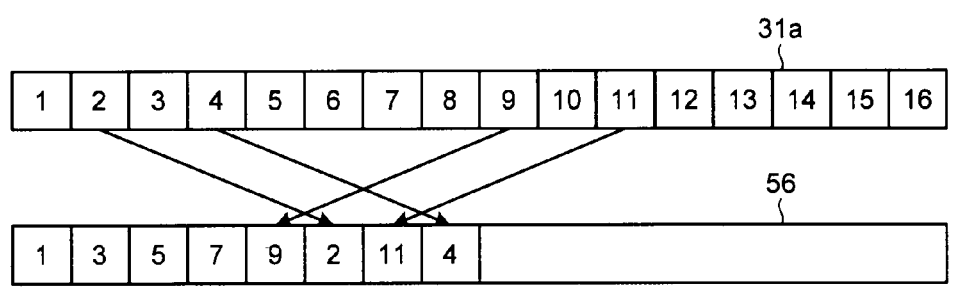
FIG. 11C is a diagram illustrating an exemplary transfer sequence of the image data according to the first embodiment.

Subsequently, the output control unit 55 requests the data transfer control unit 30a to transfer the pixels #9, #2, #11, #4 for which the ink is ejected at the timing when P is located P3 (see FIG. 10), and stores into the buffer 56 the pixels #9, #2, #11, #4, which the data transfer control unit 30a read out from the memory 31a and transferred to the control unit 55, as shown in FIG. 11C.

Figure 11D:
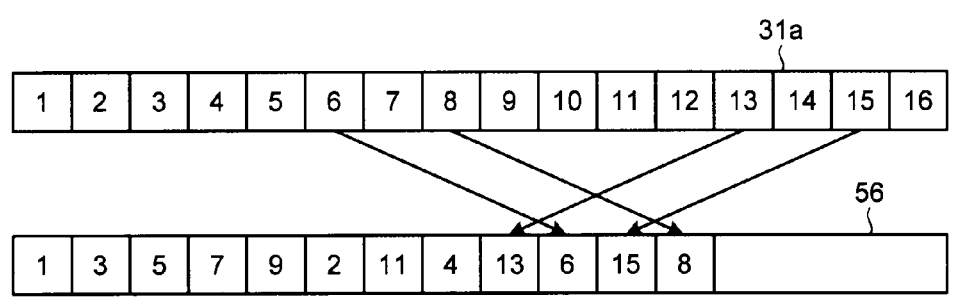
FIG. 11D is a diagram illustrating an exemplary transfer sequence of the image data according to the first embodiment.

Subsequently, the output control unit 55 requests the data transfer control unit 30a to transfer the pixels #13, #6, #15, #8 for which the ink is ejected at the timing when P is located P4 (see FIG. 10), and stores into the buffer 56 the pixels #13, #6, #15, #8, which the data transfer control unit 30a read out from the memory 31a and transferred to the control unit 55, as shown in FIG. 11D.

Figure 11E:
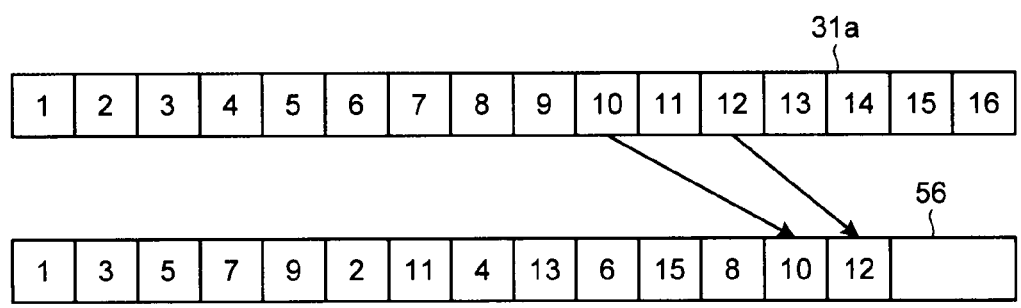
FIG. 11E is a diagram illustrating an exemplary transfer sequence of the image data according to the first embodiment.

Subsequently, the output control unit 55 requests the data transfer control unit 30a to transfer the pixels #10, #12 for which the ink is ejected at the timing when P is located P5 (see FIG. 10), and stores into the buffer 56 the pixels #10, #12, which the data transfer control unit 30a read out from the memory 31a and transferred to the control unit 55, as shown in FIG. 11E.

Figure 11F:
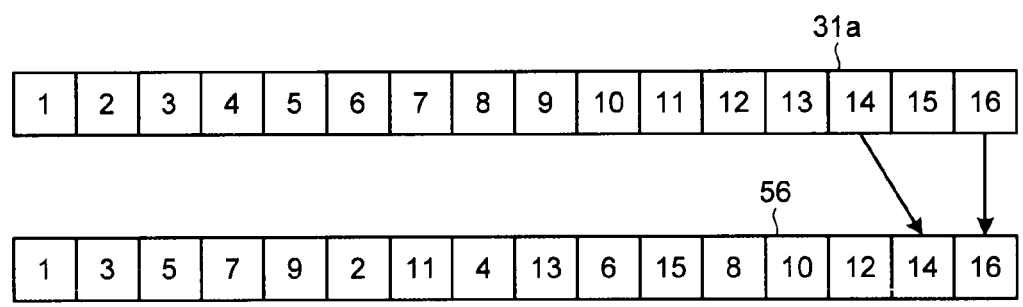
FIG. 11F is a diagram illustrating an exemplary transfer sequence of the image data according to the first embodiment.

Subsequently, the output control unit 55 requests the data transfer control unit 30a to transfer the pixels #14, #16 for which the ink is ejected at the timing when P is located P6 (see FIG. 10), and stores into the buffer 56 the pixels #14, #16, which the data transfer control unit 30a read out from the memory 31a and transferred to the control unit 55, as shown in FIG. 11F.

The image data thus stored in the buffer 56 is transferred sequentially to the head module 57, in response to the transfer request from the head module 57.

Figure 12:
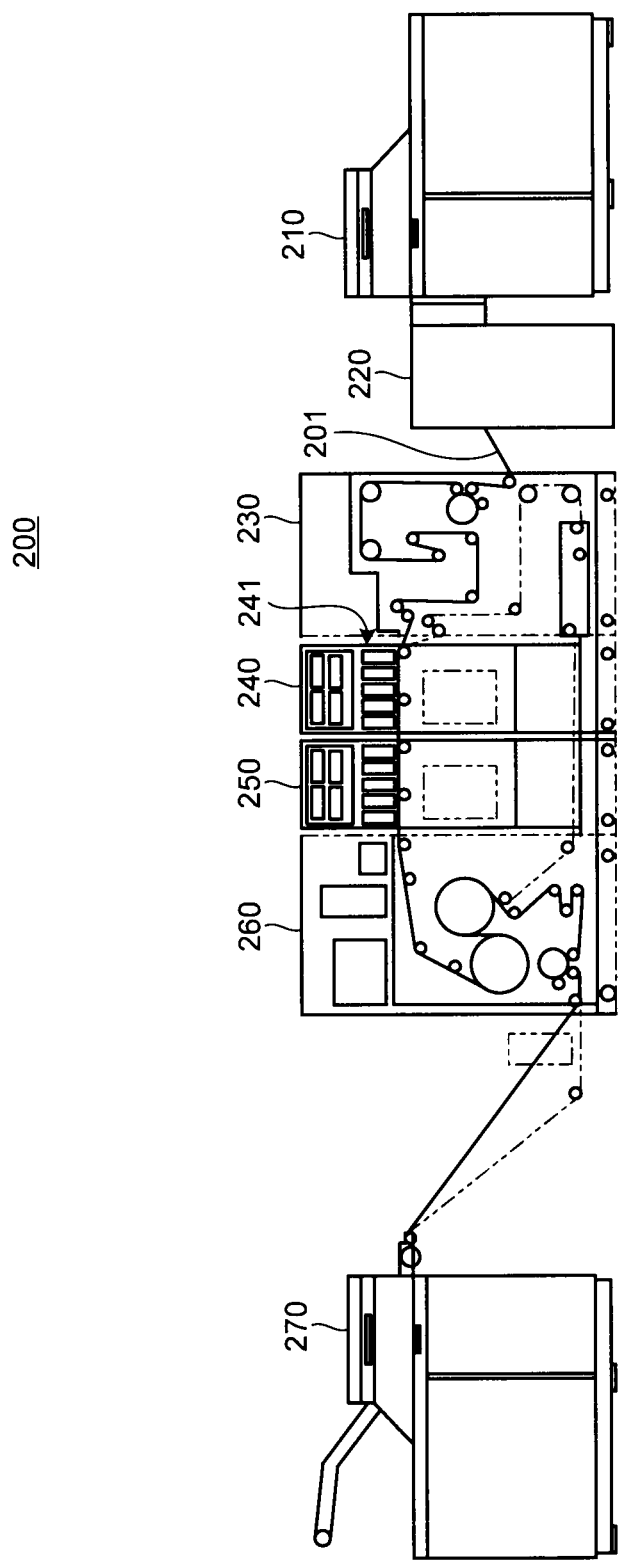
FIG. 12 is a schematic diagram illustrating an exemplary configuration of a printing device including a conveyance system of paper applicable to the first embodiment of the present invention.

FIG. 12 schematically illustrates an exemplary configuration of a printing device 200 applicable to the first embodiment, including a conveyance system of paper. As described above, in each embodiment, the printing device 200 uses continuous paper as printing paper.

Printing paper 201 is fed from a printing paper feeding unit 210 to a first conveyance unit 230 through a power supply operation box 220. In the first conveyance unit 230, the printing paper 201 is conveyed through plural rollers by conveyance control of the conveyance control unit 51, is aligned, and is fed to printer engine units 240 and 250 that correspond to the printer engine 15.

In a printing unit 241 that corresponds to the output control unit 55 and the head modules 57 to 60, the printer engine units 240 and 250 perform printing according to print image data with respect to the printing paper 201 fed from the first conveyance unit 230. The printing paper 201 of which printing is completed is discharged from the printer engine unit 250 by the conveyance control of the conveyance control unit 51 and is fed to a second conveyance unit 260. The printed paper 201 is conveyed to a predetermined position by the second conveyance unit 260 to be discharged, and is fed to a cutting unit 270. The printed paper 201 is cut by the cutting unit 270 according to perforations and divided into individual pages.

In this case, the printing paper continuously exists even in a path until the printing paper 201 is discharged from the second conveyance unit 260 after printing is performed on the printing paper 201 in the printer engine units 240 and 250, in order for the printing device 200 to perform printing on the printing paper 201 which is the continuous paper.

Incidentally, the configuration composed of the first conveyance unit 230, the printer engine units 240 and 250, and the second conveyance unit 260 can be additionally prepared to realize the both-sided printing with respect to the printing paper 201 in such a manner that the printed paper 201 that is discharged from the second conveyance unit 260 disposed on the front side is reversed and fed to the first conveyance unit 230 disposed on the rear side.

<Detail of Printing Process Applicable to the First Embodiment>

Next, a printing process applicable to the first embodiment will be further described in detail. FIG. 13 illustrates an example of control information that is transmitted/received between the upper level device 10 and the printing device controller 14 of the printing device 13 through the control line 12. In FIG. 13, the upper level device 10 is illustrated as a digital front end processor (DFE) and the printing device controller 14 is illustrated as a PCTL. The control information roughly includes (i) job information, (ii) information indicating a printer status and a printing process, (iii) information indicating a printing condition, and (iv) information indicating a connection.

The job information is used to notify a job start and a job end. The job start includes a notification of the job start with respect to the printing device controller 14 from the upper level device 10 and a response from the printing device 13 to the upper level device 10 with respect to the notification. The job end includes a notification of an end of all of the printing processes that are requested by the job start with respect to the printing device controller 14 from the upper level device 10 and a response from the printing device controller 14 to the upper level device 10 with respect to the notification. At the time of a response in the job start and the job end, a job identifier (JOBID) to identify a job is transmitted from the printing device controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printing device 13 notifies the upper level device 10 that the printing device controller 14 is ready to receive a printing process. The request/notification of printer information includes a request of necessary printer information from the upper level device 10 to the printing device controller 14, as well as a response to the request from the printing device controller 14 to the upper level device 10.

The printing process start notification includes a notification from the upper level device 10 to the printing device controller 14 indicating that the preparation of the print image data is completed and a response to the notification from the printing device 13 to the upper level device 10. The notification indicating that the preparation of the print image data is completed is notified in accordance with the sequence of the output of the print image data, page-by-page (process-by-process). It can be the above-mentioned that the page is a print unit by which a series of printing operation is performed.

The printing process request includes a notification of printing process from the printing device controller 14 to the upper level device 10 and a response to the notification from the upper level device 10 to the printing device controller 14. The printing device controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printing device controller 14 notifies these kinds of information for every plane in accordance with the sequence of requests from engine, i.e. the data transfer control units 30a, 30b, 30c and 30d. That is, the printer engine 15 retrieves the print image data composed of bitmap data from the upper level device 10.

As for the data transfer completion notification, the completion of transferring the print image data as for the requested plane is notified from the upper level device 10 to the printing device controller 14. As for the data reception completion notification, the completion of receiving the print image data as for the requested plane is notified from the printing device controller 14 to the upper level device 10. As for the printing process completion notification, the completion of print request for all pages (process) is notified from the upper level device 10 to the printing device controller 14. As for the process status report, the print status of pages (process) is notified from the printing device controller 14 to the upper level device 10. At this time, the printing device controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printing device controller 14. The obstacle information acquired according to the request is notified from the printing device controller 14 to the upper level device 10. As for the error occurrence and removal, an occurrence of any error and a removal thereof at the upper level device 10 is notified from the upper level device 10 to the printing device controller 14.

The information indicating printing conditions includes setting the printing conditions, that is, a notification of the printing conditions from the upper level device 10 to the printing device controller 14 and a response from the printing device controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printing device controller 14, and release of the registered information.

<Printing Sequence>

Figure 14:
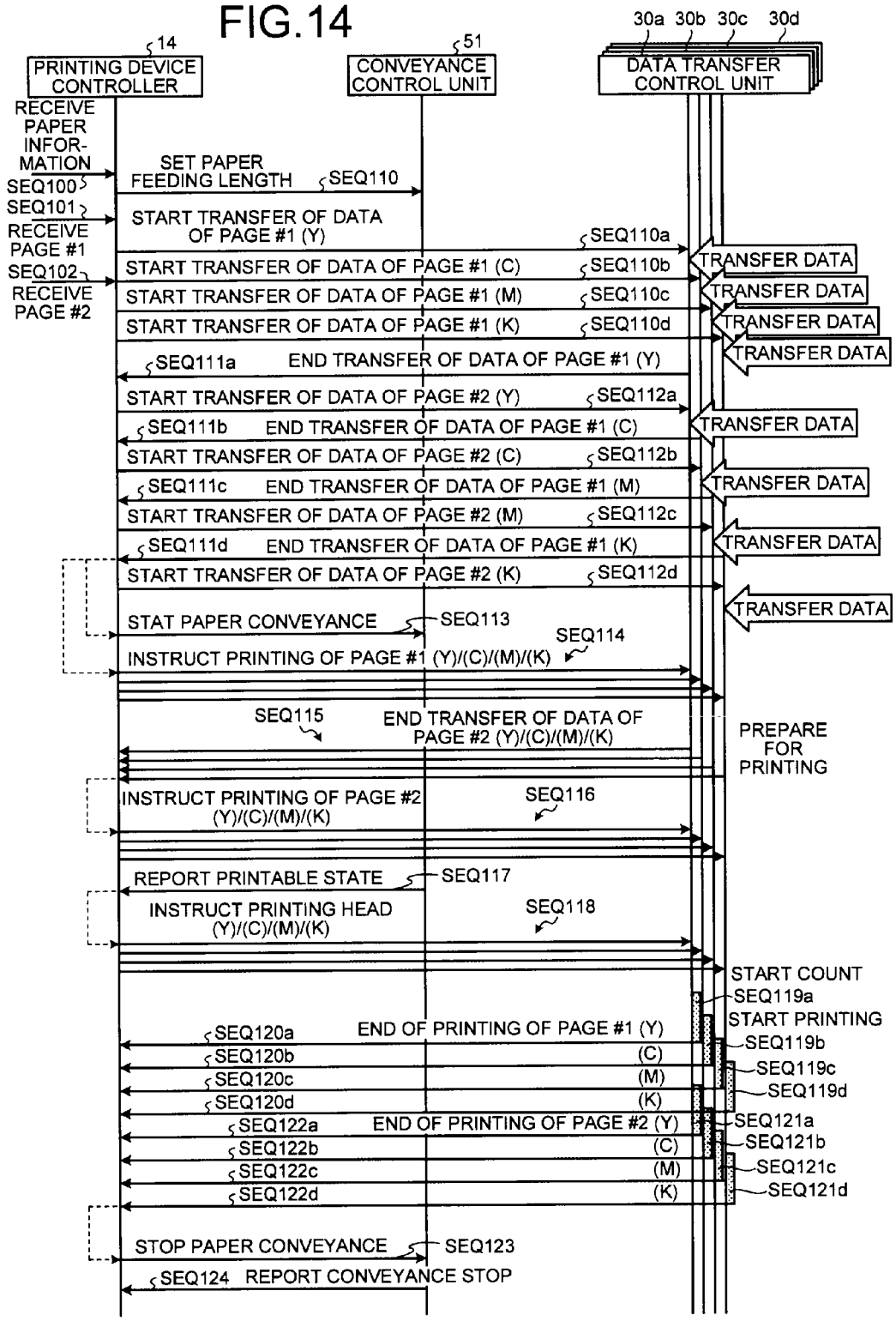
FIG. 14 is a sequence diagram conceptually illustrating an example of a printing process applicable to the first embodiment of the present invention.

Next, a printing process applicable to the first embodiment will be described. FIG. 14 is a sequence diagram conceptually illustrating an example of the printing process applicable to the first embodiment. In this case, full-color printing using the individual colors Y, C, M, and K is performed. If the printing device controller 14 receives information related to the printing paper 201 as control information from the upper level device 10 (SEQ100), paper feeding length is set to the conveyance control unit 51 on the basis of the received information (SEQ110). The paper feeding length is, for example, a size of one page in a conveyance direction.

If the printing device controller 14 receives control information indicating a job start of a first page (page #1) from the upper level device 10 (SEQ101), the printing device controller 14 requests the data transfer control units 30a, 30b, 30c, and 30d to start data transfer of the first page with respect to the colors Y, C, M, and K (SEQ110a, SEQ110b, SEQ110c, and SEQ110d). The data transfer control unit 30a requests the upper level device 10 to transmit print image data of the first page of the color Y according to the request through the data line 11a, and stores the print image data of the first page of the color Y transmitted from the upper level device 10 in the memory 31a, according to the request.

Similar to the data transfer control unit 30a, the data transfer control units 30b, 30c, and 30d request the upper level device 10 to transmit the print image data of the individual colors C, M, and K of the first page through the data lines 11b, 11c, and 11d according to the requests from SEQ110b, SEQ110c, and SEQ110d. Each of the data transfer control units 30b, 30c, and 30d stores the print image data of the first page of the individual colors C, M, and K transmitted from the upper level device 10 according to the request in the memories 31b, 31c, and 31d.

Meanwhile, in the example of FIG. 14, while the data transfer of the first page is requested from the printing device controller 14 to each of the data transfer control units 30a, 30b, 30c, and 30d, the printing device controller 14 receives control information indicating a job start of the next second page transmitted from the upper level device 10 (SEQ102). The received control information is held in, for example, the RAM 323.

Once the print image data transfer of the first page of each color from the upper level device 10 ends, each of the data transfer control units 30a, 30b, 30c, and 30d notifies the printing device controller 14 of the end of the transfer (SEQ111a, SEQ111b, SEQ111c, and SEQ111d). The printing device controller 14 requests each of the data transfer control units 30a, 30b, 30c, and 30d to start the data transfer of the second page (page #2), in response to the notification (SEQ112a, SEQ112b, SEQ112c, and SEQ112d).

Each of the data transfer control units 30a, 30b, 30c, and 30d requests the upper level device 10 to transmit the print image data of the second page of each color, in response to the request, and stores the print image data of the second page of each color transmitted from the upper level device 10 in the memories 31a, 31b, 31c, and 31d, according to the request.

Each of the data transfer control units 30a, 30b, 30c, and 30d can recognize the end of the data transfer on the basis of the data amount of the transmitted print image data. The information indicating the data amount of the printing image corresponding to one page, for example, is added to the head of the print image data by the upper level device 10 and is transmitted, when the data transfer starts with respect to each of the data transfer control units 30a, 30b, 30c, and 30d. In a case that a predetermined unit of the print image data is transferred, it may be configured that the upper level device 10 adds any end information for indicating the completion of transferring one page to the last transferred unit of the print image data corresponding to the end of one page. Alternatively, it may be configured that the upper level device 10 transmits any information for indicating the completion of transferring the print image data corresponding to one page to each transfer control unit 30a, 30b, 30c and 30d independently of the print image data, for example immediately after the print image data corresponding to one page is transferred.

Meanwhile, once the printing device controller 14 receives the notification of the completion of transferring the data of the first page from all of the data transfer control units 30a, 30b, 30c, and 30d, the printing device controller 14 requests the conveyance control unit 51 to start the paper conveyance (SEQ113). The conveyance control unit 51 starts conveyance at a predetermined speed of the printing paper 201 according to the request. The printing device controller 14 requests the conveyance control unit 51 to start the paper conveyance and instructs each of the data transfer control units 30a, 30b, 30c, and 30d to start printing of the first page (SEQ114).

If the printing paper 201 reaches a predetermined position, the conveyance control unit 51 notifies the printing device controller 14 of a printable status (SEQ117). For example, when the paper conveyance speed becomes constant and the printer engine 15 detects the predetermined position of the printing sheet 301, the conveyance control unit 51 sends a report of printable status to the control unit 23 of the printing device controller 14. The printing device controller 14 send an instruction of the print start position to each of the data transfer control units 30a, 30b, 30c and 30d, in response to the report of printable status from the conveyance control unit 51 (SEQ118).

Each of the data transfer control units 30a, 30b, 30c and 30d starts the printing operation in accordance with the instruction of the print start position. In this example, the head modules of the individual colors Y, C, M, and K are arranged in order of the head modules 57, 58, 59, and 60 along a conveyance direction of the printing paper 201. In this case, once the print start position of the first page in the printing paper 201 reaches a position to be printed by the head module 57, the data transfer control unit 30a firstly starts reading out the print image data of the first page from the memory 31a. The print image data of the color Y read from the memory 31a is transmitted to the image output unit 50. The print image data is supplied to the head module 57 through the output control unit 55 and printing with respect to the printing paper 201 is performed (SEQ119a). Once printing the first page of the color Y is completed, the completed of the printing is notified to the printing device controller 14 (SEQ120a).

Next, once the print start position of the first page in the printing paper 201 reaches a position to be printed by the head module 58, the data transfer control unit 30b starts reading out the print image data of the first page from the memory 31b. The print image data of the color C read from the memory 31b is transmitted to the image output unit 50. The print image data is supplied to the head module 58 through the output control unit 55 and printing with respect to the printing paper 201 is performed (SEQ119b). Once printing the first page of the color C ends, the end of the printing is notified to the printing device controller 14 (SEQ120b).

Hereinafter, in the same way as mentioned above, the printing operations with the colors M and K are sequentially started (SEQ119c and SEQ119d). Once the printing operations with the colors M and K are completed, the completion of the printing operation is notified to the printing device controller 14 (SEQ120c and SEQ120d).

Meanwhile, once transferring each color print image data of the second page started at SEQ112a to SEQ112d are completed, each of the data transfer control units 30a, 30b, 30c and 30d notifies the printing device controller 14 of the completion of transferring the data (SEQ115). The printing device controller 14 instructs each of the data transfer control units 30a, 30b, 30c and 30d to start printing the second page, according to the data transfer completion notification (SEQ116).

Each of the data transfer control units 30a, 30b, 30c and 30d starts to print the second page after the completion of printing the first page. For example, when the print start position of the second page in the printing paper 201 reaches a position to be printed by the head module 57 after the completion of printing the first page (SEQ120a), the data transfer control unit 30a reads out the print image data of the color Y of the second page from the memory 31a, supplies the print image data to the image output unit 50, and starts printing on the printing paper 201 (SEQ121a). Once the printing operation of the color Y is completed, the completion of the printing operation is notified to the printing device controller 14 (SEQ122a).

In the same way, also in the data transfer control units 30b, 30c, and 30d, when the print start position of the second page reaches each position to be printed by the head modules 58, 59, and 60, each color print image data is read from the memories 31b, 31c and 31d, respectively, and printing with respect to the printing paper 201 is started (SEQ121b to SEQ121d). When the printing operation of each color is completed, the completion of the printing operation of each color is notified to the printing device controller 14 (SEQ122b to SEQ122d).

Once the printing device controller 14 receives the printing process completion notification of the color K of the second page from the data transfer control unit 30d, the printing device controller 14 assumes that the printing operation of the final page according to the print job ends and requests the conveyance control unit 51 to stop conveyance of the printing paper 201 (SEQ123). The conveyance control unit 51 stops conveyance of the printing paper 201 according to the request and reports the stop of conveyance to the printing device controller 14 (SEQ124). Thereby, a series of printing processes terminates.

Figure 15:
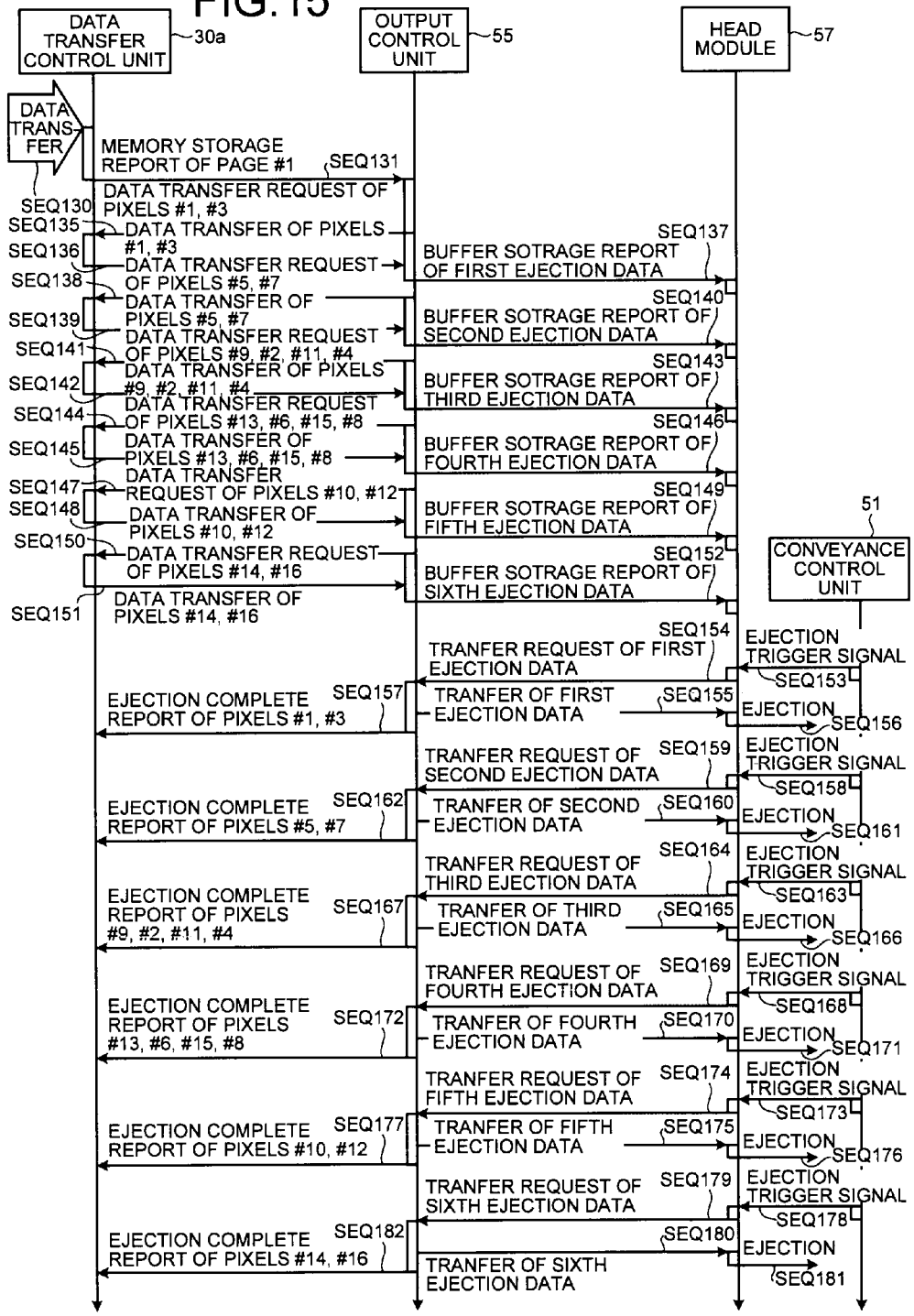
FIG. 15 is a sequence diagram specifically illustrating an example of a process at SEQ119a according to the first embodiment of the present invention.

FIG. 15 is a sequence diagram illustrating an exemplary processing of SEQ119a in FIG. 14 in the first embodiment. This figure shows a sequence in a case for the image data transfer order explained with FIGS. 11A to 11F, as well as the ink ejection order explained with FIG. 9 and FIG. 10.

The data transfer control unit 30a sends a memory storage report for color C of the first page (page #1) to the output control unit 55 (SEQ131), when the image data for color C of the first page is transferred from the upper level device 10 (SEQ130) and the transferred image data for color C of the first page is completely stored into the memory 31a.

Subsequently, the output control unit 55 requests the data transfer control unit 30a to transfer the data of pixels #1, #3, which are the first ejection data from the head module 57 (SEQ135). The data of pixels #1, #3 are read out from the memory 31a and transferred by the data transfer control unit 30a and stored into the buffer by the output control unit 55 (SEQ136). Then, after the data of pixels #1, #3 are stored into the buffer 56, the output control unit 55 sends a buffer storage report of the first ejection data to the head module 57 (SEQ137).

In the first embodiment, the pixel sequence of the image data is rearranged in accordance with the ink ejection order. Thereby, the buffer storage report sufficiently reports that the first ejection data relates to the head 301a and the head 301b (see FIG. 10) without reporting pixels in detail. This buffer storage report enables to judge that the head module 57 is ready to eject ink on the basis of the first ejection data.

Hereinafter, the output control unit 55 repeats the same processing as SEQ135 to SEQ137, as for the second to sixth ejection data (P=P2 to P6) from the head module 57 (SEQ138 to SEQ152).

Subsequently, the head module 57 requests the output control unit 55 to transfer the first ejection data (SEQ154), once the conveyance control unit 51 conveys the printing paper sheet so that P is located at P1 and the conveyance control unit 51 sends the first ejection trigger signal to the head module 57 (SEQ153). Then, the head module 57 causes the corresponding head to eject ink on the basis of the first ejection data read out from the buffer 56 and transferred by the output control unit 55 (SEQ155, SEQ156). Also, the output control unit 55 sends an ejection complete report about pixels #1, #3 to the data transfer control unit 30a, when the transfer to the head module 57 is completed (SEQ157).

Hereinafter, the head module 57 and the output control unit 55 repeat the same processing as SEQ153 to SEQ157, as for the second to sixth ejection data (P=P2 to P6) from the head module 57 (SEQ158 to SEQ182).

Figure 16:
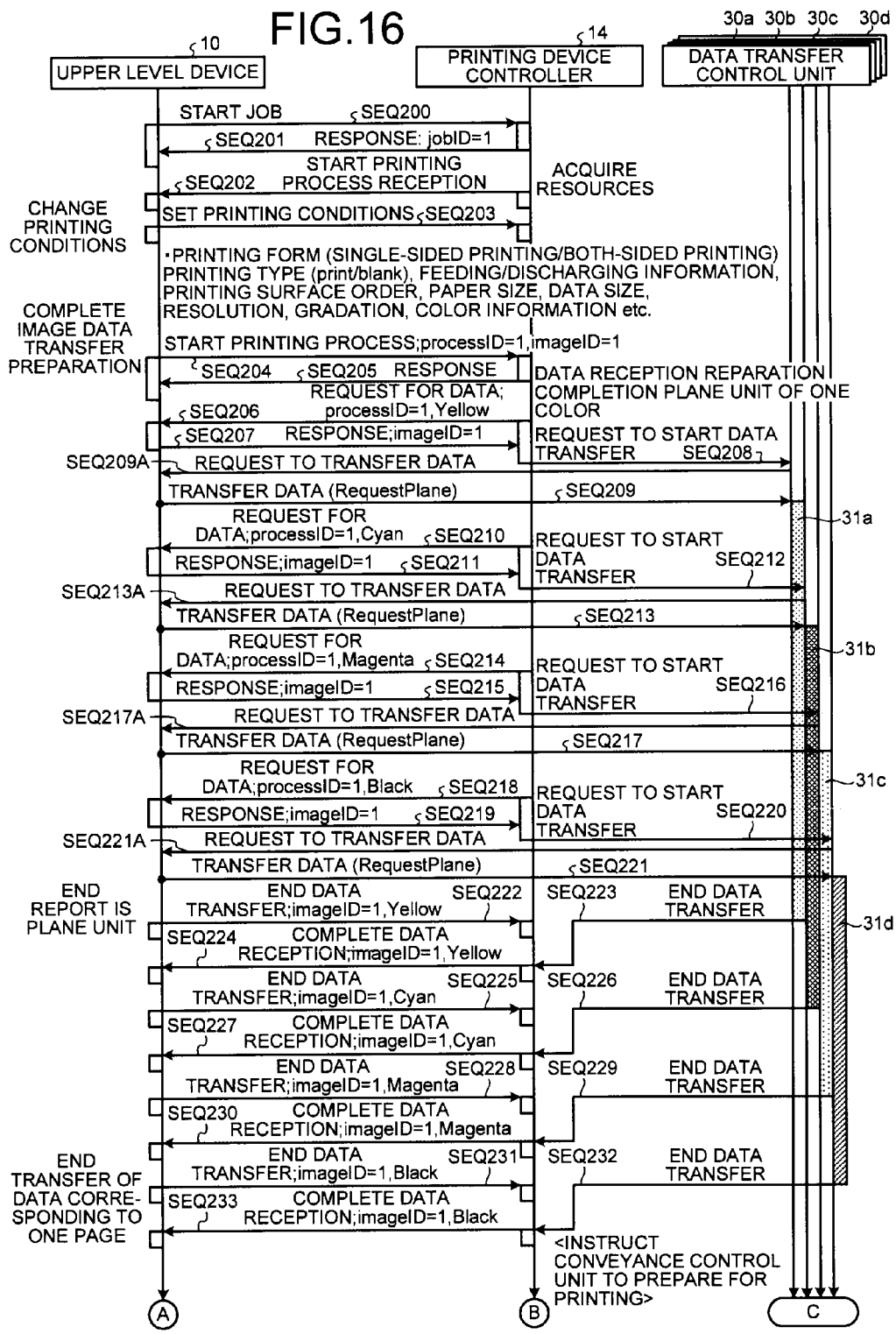
FIG. 16 is a sequence diagram specifically illustrating an example of a printing process applicable to the first embodiment of the present invention.
Figure 17:
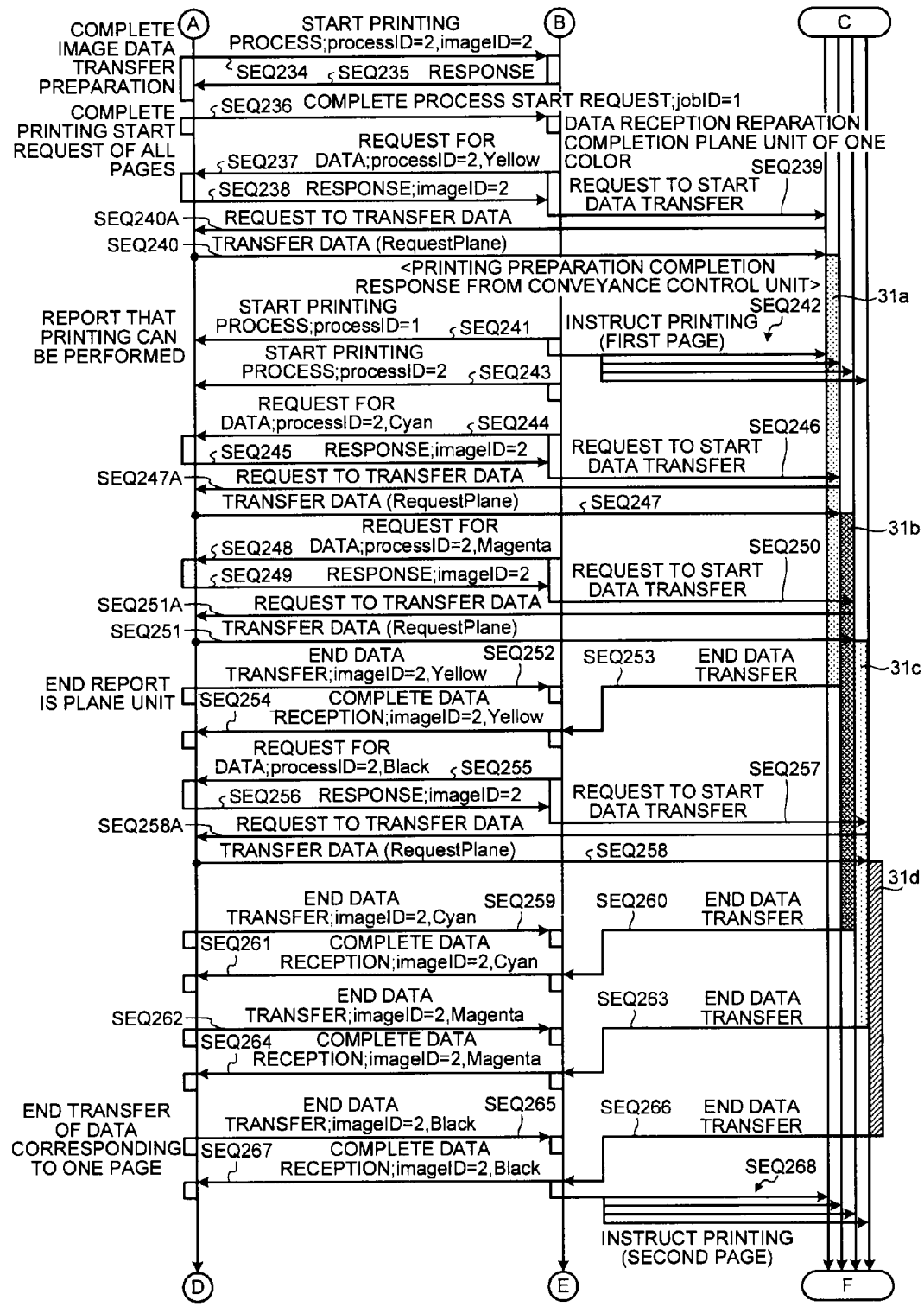
FIG. 17 is a sequence diagram specifically illustrating an example of a printing process applicable to the first embodiment of the present invention.
Figure 18:
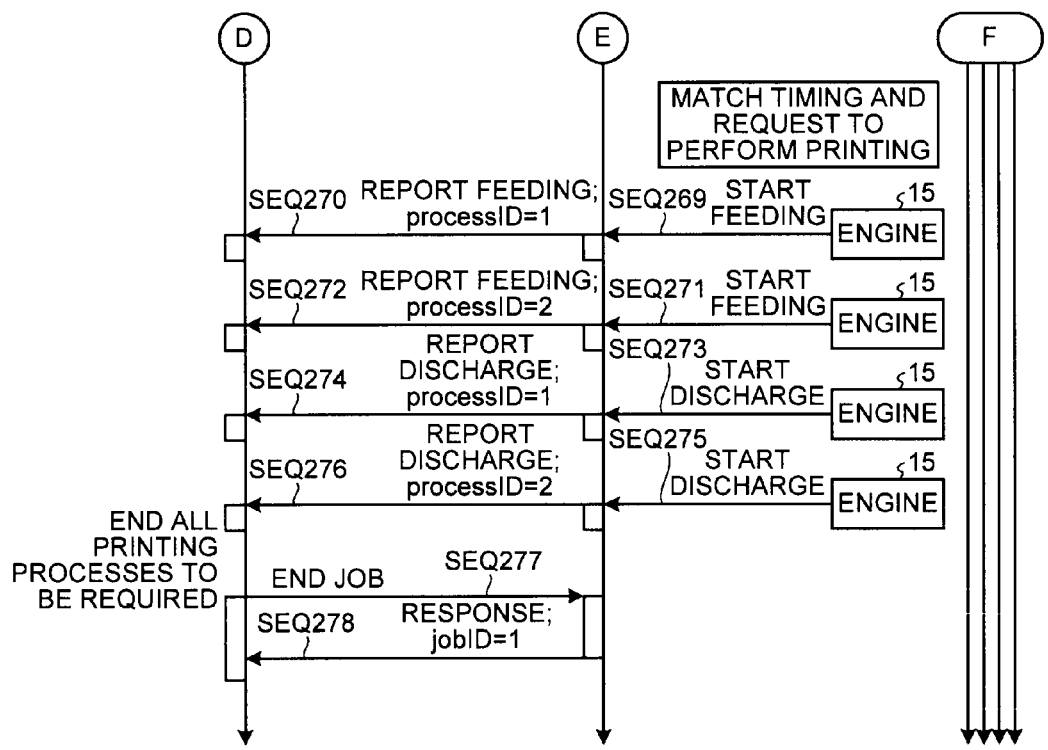
FIG. 18 is a sequence diagram specifically illustrating an example of a printing process applicable to the first embodiment of the present invention.

FIGS. 16 to 18 are sequence diagrams specifically illustrating an example of a printing process applicable to the first embodiment. In FIGS. 16 to 18, reference numerals A to F indicate that the process proceeds to the corresponding reference numerals between the different drawings. Hereinafter, it is assumed that a print job is to perform printing corresponding to two pages.

Referring to FIG. 16, first, control information of the print job is transmitted from the upper level device 10 to the printing device controller 14 through the control line 12 (SEQ200). The printing device controller 14 transmits control information indicating the job identifier jobID=1 responding to the control information to the upper level device 10 through the control line 12 (SEQ201). The printing device controller 14 acquires resources to execute a job according to the start of the job. The printing device controller 14 transmits control information indicating a printing process reception start to the upper level device 10 through the control line 12 (SEQ202).

Next, the upper level device 10 transmits control information to determine printing conditions to the printing device controller 14 through the control line 12 (SEQ203). The printing conditions that are set to the printing device controller 14 include a printing form, a printing type, feeding/discharging information, order of printing surfaces, a size of printing paper, a data size of print image data, resolution and gradation, and color information as described with reference to FIG. 13. Further, the printing conditions may include information of the number of pages to be printed. Once the control information is received in the printing device controller 14, the various printing conditions that are included in the received control information are written in a register of the printing device controller 14, for example, and the printing conditions are set.

Next, the upper level device 10 transmits the control information of the printing process start of the first page to the printing device controller 14 through the control line 12 (SEQ204). The control information includes a process identification number processID=1 to identify the process and an image identification number imageID=1 indicating an image constituting the first page. The printing device controller 14 returns control information of the printing process start to be a response to the printing process start, to the upper level device 10 (SEQ205).

Next, the printing device controller 14 transmits control information of the printing process request to the upper level device 10 and requests the upper level device 10 to transmit the print image data. The printing process request is sequentially processed in arrangement order of the colors of the printer engine 15, with respect to the individual colors Y, C, M, and K. In this example, the head modules of the colors Y, C, M, and K along a conveyance direction of the printing paper 201 are arranged in order of the head modules 57, 58, 59, and 60.

First, the printing device controller 14 transmits the control information of the printing process request to request to transmit the print image data of the color Y to the upper level device 10 through the control line 12 (SEQ206). The control information includes process identification number processID=1 to designate a process and color information Yellow to designate the color Y. The upper level device 10 returns the control information including the image identification number imageID=1 to the printing device controller 14 in response to the control information (SEQ207). Once the printing device controller 14 receives the control information, the printing device controller 14 requests the data transfer control unit 30a corresponding to the color Y to start to transmit the print image data (SEQ208). At this time, the printing device controller 14 transmits a data size of the print image data requiring the start of the transmission and the request to the data transfer control unit 30a.

The data transfer control unit 30a receives the request and requests the upper level device 10 to transmit the print image data of the plane of the color Y through the data line 11a (SEQ209A), and the print image data of the color Y is transmitted from the upper level device 10 to the data transfer control unit 30a (SEQ209) according to the request. The transmitted print image data is stored in an area in the memory 31a of the data transfer control unit 30a that is allocated for the print image data of the first page.

Hereinafter, the same processes as those of SEQ206, SEQ207, SEQ208, SEQ209A, and SEQ209 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the first page (SEQ210 to SEQ221).

Once the print image data transfer of one plane completes, the upper level device 10 transmits the control information of the data transfer completion to the printing device controller 14. The printing device controller 14 transmits the control information of the reception completion of the print image data to the upper level device 10, according to the control information.

For example, once the print image data transfer of the plane of the color Y completes, the upper level device 10 transmits the control information of the data transfer completion including the image identification number imageID=1 and the color information Yellow to the printing device controller 14 (SEQ222). Meanwhile, once the print image data transfer from the upper level device 10 through the data line 11a completes, the data transfer control unit 30a notifies the printing device controller 14 of the completion of the transfer (SEQ223). The printing device controller 14 transmits the control information of the data reception completion including the image identification number imageID=1 and the color information Yellow to the upper level device 10, in response to the notification (SEQ224).

Hereinafter, the same processes as those of SEQ222 to SEQ224 are repeated with respect to other colors C, M, and K, respectively, in accordance with the completion of transferring each print image data. And the control information of the data reception completion is transmitted to the upper level device 10 (SEQ225 to SEQ233).

After the printing device controller 14 transmits the control information of the data reception completion with respect to the final print image data (that is, print image data of the color K) of the first page to the upper level device 10 at SEQ233, the printing device controller 14 instructs the conveyance control unit 51 to prepare for printing. The conveyance control unit 51 starts to convey the printing paper 201 to the printing position, according to the instruction.

The description proceeds to FIG. 17. Once the print image data transfer of each color of the first page is completed, the upper level device 10 transmits the control information of the printing process start of the second page to the printing device controller 14 through the control line 12 (SEQ234). The control information includes the process identification number processID=2 to identify the process of the second page and the image identification number imageID=2 indicating the image constituting the second page. The printing device controller 14 returns the control information of the printing process start to be a response to the printing process start to the upper level device 10 (SEQ235).

For example, when printing of the second page is performed, the printing process start request is completed by the processes of SEQ234 and SEQ235. For this reason, once the upper level device 10 receives the response to the printing process start request of the second page at SEQ235, the upper level device 10 transmits the control information of the process start request completion where the job identifier jobID=1 is designated to the printing device controller 14, at SEQ236.

Next, similar to SEQ206 to SEQ221, the printing device controller 14 transmits the control information of the printing process request to the upper level device 10 and requests the upper level device 10 to transmit the print image data. The printing process request is sequentially processed according to arrangement order of the colors in the printer engine 15, with respect to each of the colors Y, C, M, and K.

First, the printing device controller 14 transmits the control information of the printing process request to request to transmit the print image data of the color Y to the upper level device 10 through the control line 12 (SEQ237). The control information includes the process identification number processID=2 to designate the process and the color information Yellow to designate the color Y. The upper level device 10 returns the control information including the image identification number imageID=2 to the printing device controller 14, in response to the control information (SEQ238). Once the printing device controller 14 receives the control information, the printing device controller 14 requests the data transfer control unit 30a corresponding to the color Y to start to transmit the print image data (SEQ239).

The data transfer control unit 30a receives the request and requests the upper level device 10 to transmit the print image data of the plane of the color Y through the data line 11a (SEQ240A), and the print image data of the color Y is transmitted from the upper level device 10 to the data transfer control unit 30a according to the request (SEQ240). The transmitted print image data is stored in an area in the memory 31a of the data transfer control unit 30a that is allocated for the print image data of the second page.

Hereinafter, the same processes as those of SEQ237, SEQ238, SEQ239, SEQ240A, and SEQ240 are repeated with respect to each of the other colors C, M, and K, the print image data of each color is transmitted from the upper level device 10 to the data transfer control units 30b, 30c, and 30d through the data lines 11b, 11c, and 11d and are stored in the areas of the memories 31b, 31c, and 31d that are allocated for the print image data of the second page (SEQ244 to SEQ251 and SEQ255 to SEQ258).

Similar to the above case, the upper level device 10 transmits the control information of the data transfer completion to the printing device controller 14, whenever the transmission of the print image data of one plane ends. The printing device controller 14 transmits the control information of the reception completion of the print image data to the upper level device 10, in response to the control information.

In the example of FIG. 17, once the print image data transfer of the color Y at SEQ240 completes, the upper level device 10 transmits the control information of the data transfer completion to the printing device controller 14 (SEQ252). Once the print image data transfer from the upper level device 10 through the data line 11a completes, the data transfer control unit 30a transmits the notification indicating the completion of the transfer to the printing device controller 14 (SEQ253). The printing device controller 14 transmits the control information of the data reception completion including the image identification number imageID=2 and the color information Yellow to the upper level device 10, in response to the notification (SEQ254).

Hereinafter, the same processes as those of SEQ252 to SEQ254 are repeated with respect to each of the other colors C, M, and K according to the completion of transferring each print image data, and the control information of the data reception completion is transmitted to the upper level device 10 (SEQ259 to SEQ267).

In the example of FIG. 17, the response indicating that the printing preparation from the conveyance control unit 51 is completed according to the instruction of the printing preparation with respect to the conveyance control unit 51 immediately before SEQ234 described above is notified from the conveyance control unit 51 to the printing device controller 14 immediately after SEQ240. Once the printing device controller 14 receives the notification, the printing device controller 14 transmits the two items of control information of the printing process start of the process identification number processID=1 and the process identification number processID=2 to the upper level device 10 (SEQ241 and SEQ243). Thereby, the notification indicating that it is ready to perform the printing of the first page and the second page is transmitted to the upper level device 10.

At the time point of SEQ241, the transfers of each color print image data of the first page with respect to the data transfer control units 30a, 30b, 30c, and 30d are completed. For this reason, the printing device controller 14 notifies each of the data transfer control units 30a, 30b, 30c, and 30d of a printing instruction to perform printing of the first page (SEQ242). The printing instructions are stored in the memories 31a, 31b, 31c, and 31d in the data transfer control units 30a, 30b, 30c, and 30d. The actual print operation according to the printing instruction is executed by matching timing with timing of a print operation of a page to be executed hereinafter.

In the example of FIG. 17, in the printing device controller 14, the request with respect to the upper level device 10 of the print image data of the plane of the color C where transfer secondly starts is delayed due to transmission of the control information of the printing process start of SEQ241 and SEQ243 (refer to SEQ244). Due to the delay, the transfer of the print image data of the plane of the color Y where the transfer first starts may be completed before the transfer of the print image data of the plane of the color K starts (refer to SEQ253). After the notification process of the transfer completion of the print image data of the plane of the color Y (SEQ253), the transfer of the print image data of the plane of the color K starts (SEQ257 and SEQ258).

During the data transfer process of the first page illustrated in FIG. 16, after the transfer of the print image data of each color is performed in order of the colors and the transfer of the print image data ends, the data transfer end process is executed in order of the colors. Meanwhile, during the data transfer process of the second page that is illustrated in FIG. 17, the data transfer end process may start before the transmission of the print image data of each color ends.

As described above, the data transfer control units 30a, 30b, 30c, and 30d to control the transmission of the data of the colors Y, C, M, and K are independently configured and the printing device controller 14 can independently communicate with the data transfer control units 30a, 30b, 30c, and 30d. The data transfer control units 30a, 30b, 30c, and 30d independently execute the process. For this reason, the process does not need to be changed, even though another process is interrupted during a series of processes executed by the data transfer control units 30a, 30b, 30c, and 30d.

At SEQ267, once the printing device controller 14 notifies the upper level device 10 of completion of transmission of the print image data of the plane of the color K, the printing device controller 14 notifies each of the data transfer control units 30a, 30b, 30c, and 30d of a printing instruction to instruct to perform printing of the second page (SEQ268).

The description proceeds to FIG. 18. In the printer engine 15, printing of the first page is executed according to a printing instruction of SEQ242 and feeding of the printing paper 201 starts. The printer engine 15 notifies the printing device controller 14 of the feeding start of the first page (SEQ269). Once the printing device controller 14 receives the notification, the printing device controller 14 transmits control information indicating that the process identification number processID is set to 1 and feeding of the first page starts, to the upper level device 10 (SEQ270). In addition, the printing device controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the first page with respect to the printing paper 201.

Similarly, once printing of the first page is completed and printing of the second page starts, the printer engine 15 notifies the printing device controller 14 of the feeding start of the second page (SEQ271). Once the printing device controller 14 receives the notification, the printing device controller 14 transmits control information indicating that the process identification number processID is set to 2 and feeding of the second page starts, to the upper level device 10 (SEQ272). In addition, the printing device controller 14 instructs the data transfer control units 30a, 30b, 30c, and 30d to execute printing in synchronization with each other. According to the printing instruction, the data transfer control units 30a, 30b, 30c, and 30d read the print image data of the colors Y, C, M, and K from the memories 31a, 31b, 31c, and 31d and sequentially execute printing of each plane of the second page with respect to the printing paper 201.

Once printing of each color of the first page ends and the first page of the printing paper 201 is discharged, the printer engine 15 notifies the printing device controller 14 of the end of the printing and the discharge of the first page (SEQ273). Once the printing device controller 14 receives the notification, the printing device controller 14 transmits control information indicating that the process identification number processID is set to 1 and the printing paper 201 of the first page is discharged, to the upper level device 10 (SEQ274). Similar to the above case, once printing of each color of the second page ends and the second page of the printing paper 201 is discharged, the printer engine 15 notifies the printing device controller 14 of the end of the printing and the discharge of the second page (SEQ275). The printing device controller 14 transmits control information indicating that the process identification number processID is set to 2 and the printing paper 201 of the second page is discharged, to the upper level device 10, in response to the notification (SEQ276).

Once the upper level device 10 receives a discharge report corresponding to information indicating the number of pages to be printed included in the control information of setting of the printing conditions from the printing device controller 14 at SEQ203, the upper level device 10 determines that the printing based on the job where the start is notified at SEQ200 ends, and transmits control information of the end of the job of the job identification number jobID=1 to the printing device controller 14 (SEQ277). Once the printing device controller 14 receives the control information, the printing device controller 14 sets the job identification number jobID=1 and transmits control information of the response to the upper level device 10 (SEQ278). Accordingly, a series of printing processes ends.

Thus, according to this embodiment, the data transfer control units 30a to 30d for controlling the data transfer of Y, C, M, and K are configured independently of each other. Furthermore, the printing device controller 14 is connected with respective data transfer control units 30a to 30d via the engine I/F control lines 40a to 40d, so that the communications between the printing device controller 14 and respective data transfer control units 30a to 30d are independently performed by respective data transfer control units 30a to 30d. Furthermore, the data transfer control units 30a to 30d performs processing, independently of each other.

Thereby, if another processing interrupts a series of processing such as processing of SEQ237 to SEQ266 by respective data transfer control units 30a to 30d, there is no need to change respective processing. Furthermore, since the processing by respective data transfer control units 30a to 30d is independent, it is easy to add or delete respective data transfer control units 30a to 30d. Thereby, many variations of system configuration can be provided with the common construction.

Second Embodiment

In the second embodiment, an explanation will be made on an example in which four printer engines are mounted on the printing device, as mentioned above. Incidentally, hereinafter, the explanation will be focused on the difference from the first embodiment, and the components having the same functions as in the first embodiment are accompanied with the same names or reference numerals as in the first embodiment, and the explanation thereof is omitted.

Figure 19:
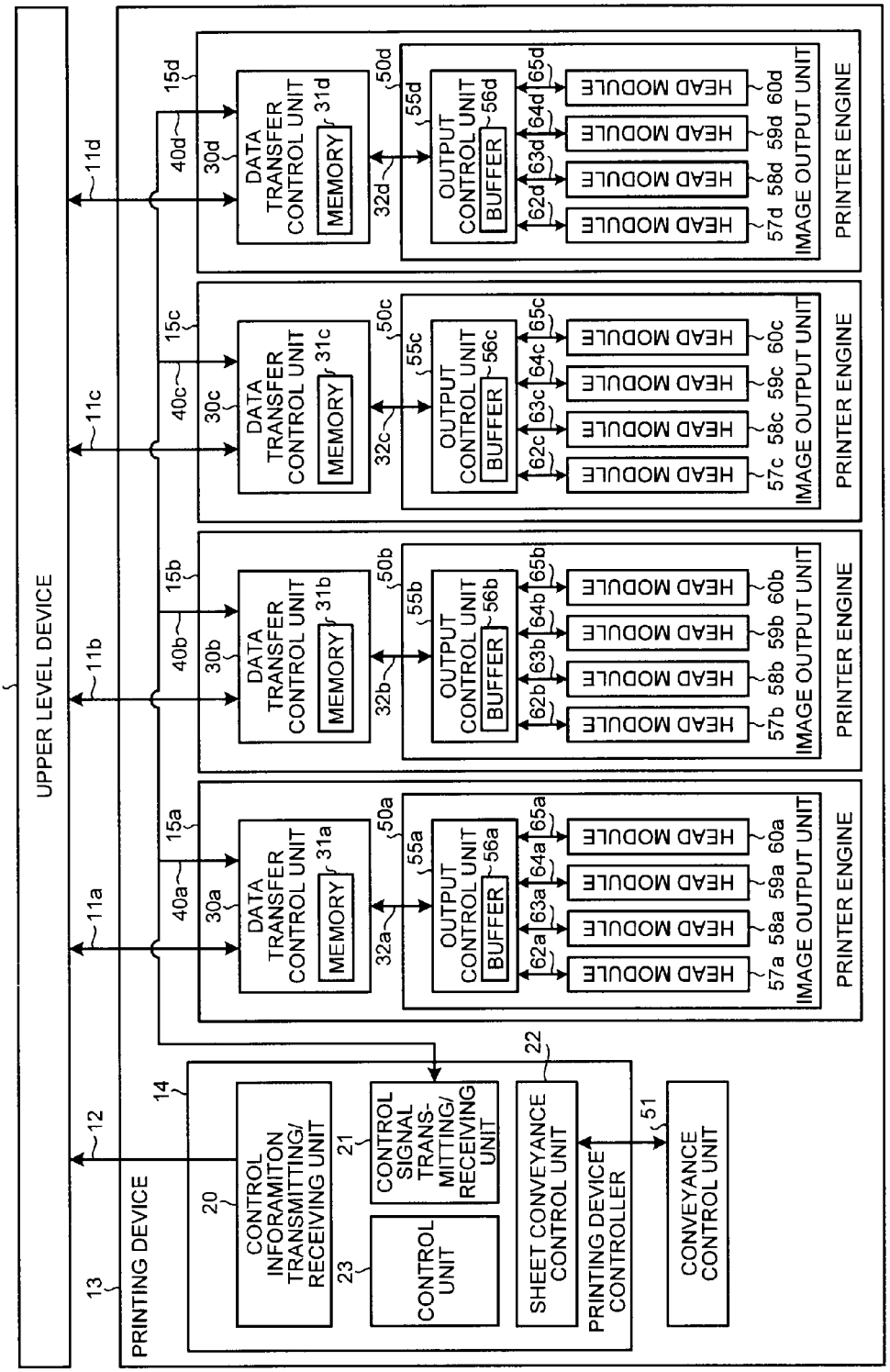
FIG. 19 is a block diagram illustrating an exemplary detail configuration of a printing device according to a second embodiment of the present invention.

FIG. 19 is a block diagram illustrating an exemplary configuration of a printing device 13 according to the second embodiment. As shown in FIG. 19, the printing device 13 includes a printing device controller 14, printer engines 15a to 15d, and a conveyance control unit 51.

The printing device controller 14 (a control unit 23) controls the printing operation of printer engines 15a to 15d via engine I/F control lines 40a to 40d, respectively.

The printer engines 15a to 15d, to each of which data lines 11a to 11d are connected respectively, perform the printing processing of each color image data transferred from the upper level device 10 via the data lines 11a to 11d, respectively.

The printer engine 15a includes a data transfer control unit 30a, an output control unit 55a, head modules for color C 57a, 58a, 59a, and 60a, a data line 32a for connecting the data transfer control unit 30a with the output control unit 55a, a plurality of data lines 62a, 63a, 64a, and 65a for connecting the output control unit 55a with respective head modules for color C 57a, 58a, 59a, and 60a. However, the relationship between the color and the head modules 57a, 58a, 59a, and 60a is not limited to this example.

The printer engine 15b includes a data transfer control unit 30b, an output control unit 55b, head modules for color M 57b, 58b, 59b, and 60b, a data line 32b for connecting the data transfer control unit 30b with the output control unit 55b, a plurality of data lines 62b, 63b, 64b, and 65b for connecting the output control unit 55b with respective head modules for color M 57b, 58b, 59b, and 60b. However, the relationship between the color and the head modules 57b, 58b, 59b, and 60b is not limited to this example.

The printer engine 15c includes a data transfer control unit 30c, an output control unit 55c, head modules for color Y 57c, 58c, 59c, and 60c, a data line 32c for connecting the data transfer control unit 30c with the output control unit 55c, a plurality of data lines 62c, 63c, 64c, and 65c for connecting the output control unit 55c with respective head modules for color Y 57c, 58c, 59c, and 60c. However, the relationship between the color and the head modules 57c, 58c, 59c, and 60c is not limited to this example.

The printer engine 15d includes a data transfer control unit 30d, an output control unit 55d, head modules for color K 57d, 58d, 59d, and 60d, a data line 32d for connecting the data transfer control unit 30d with the output control unit 55d, a plurality of data lines 62d, 63d, 64d, and 65d for connecting the output control unit 55d with respective head modules for color K 57d, 58d, 59d, and 60d. However, the relationship between the color and the head modules 57d, 58d, 59d, and 60d is not limited to this example.

In the example in which four printer engines are mounted on the printing device 13 as in the second embodiment, each printer engine may have one data transfer control unit and four head modules. Furthermore, the one data transfer control unit corresponds to the four head modules. However, the configuration of the printer engine in the case that four printer engines are mounted on the printing device 13 is not limited to this. Incidentally, the data transfer control unit and the head modules are attachable to and detachable from the printer engine.

Incidentally, the printer engines 15a to 15d may have the common configuration. Therefore, now the explanation will be focused on the printer engine 15a as representative from among the printer engines 15a to 15d.

The head modules 57a, 58a, 59a, and 60a, to each of which the data lines 62a, 63a, 64a, and 65a are connected respectively, have a plurality of heads for ejecting ink, respectively. The head modules 57a, 58a, 59a, and 60a request the output control unit 55a (explained later) to transfer the ejection data, respectively, in accordance with the ejection trigger signal sent from the conveyance control unit 51. And, the head modules 57a, 58a, 59a, and 60a cause the corresponding heads to eject ink, on the basis of the transferred ejection data. Incidentally, respective head modules 57a, 58a, 59a, and 60a are connected with the conveyance control unit 51 via control lines (not shown).

Figure 20:
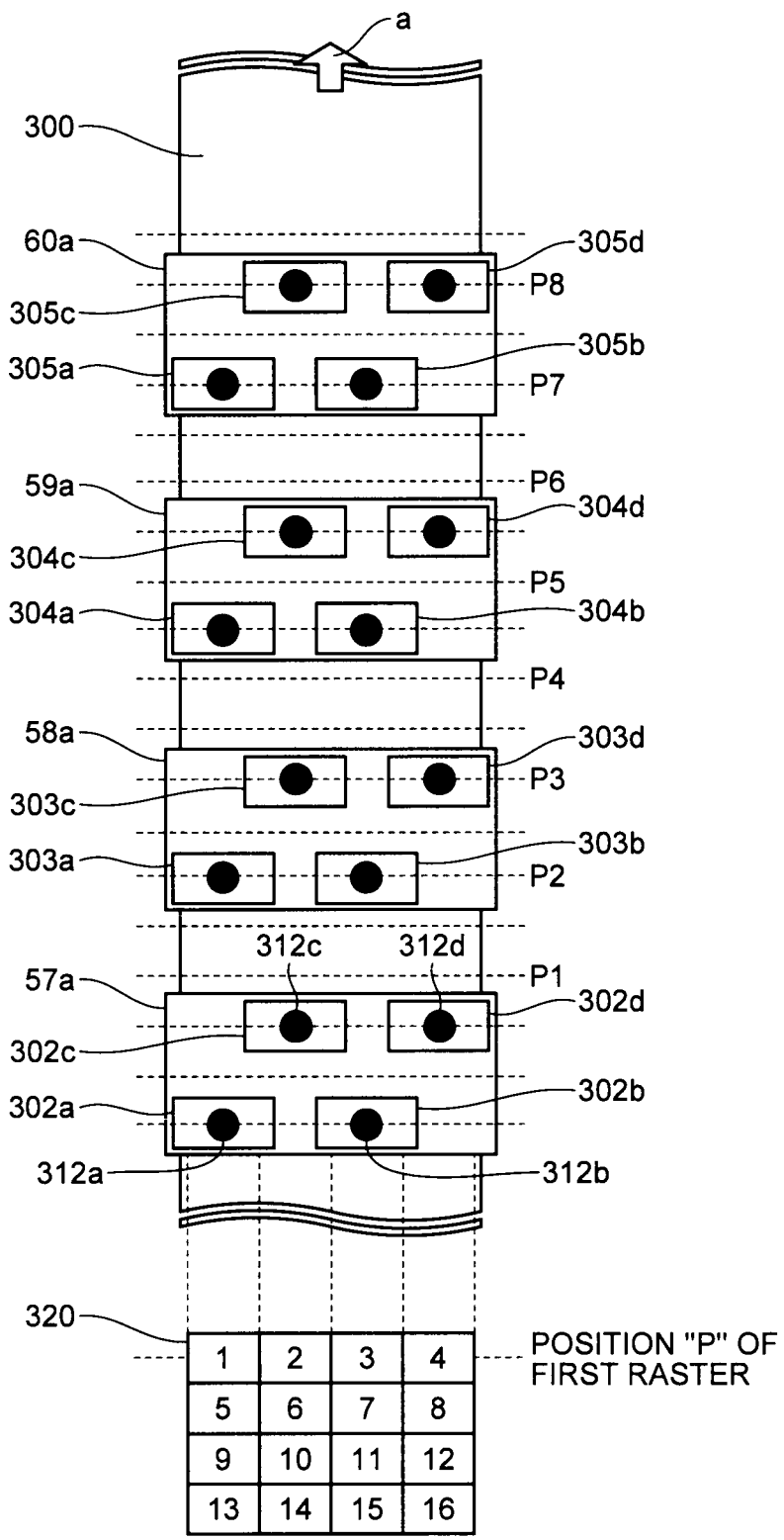
FIG. 20 is a schematic diagram illustrating a relationship between a head module according to the second embodiment and the image data corresponding to one page to be printed.
Figure 21:
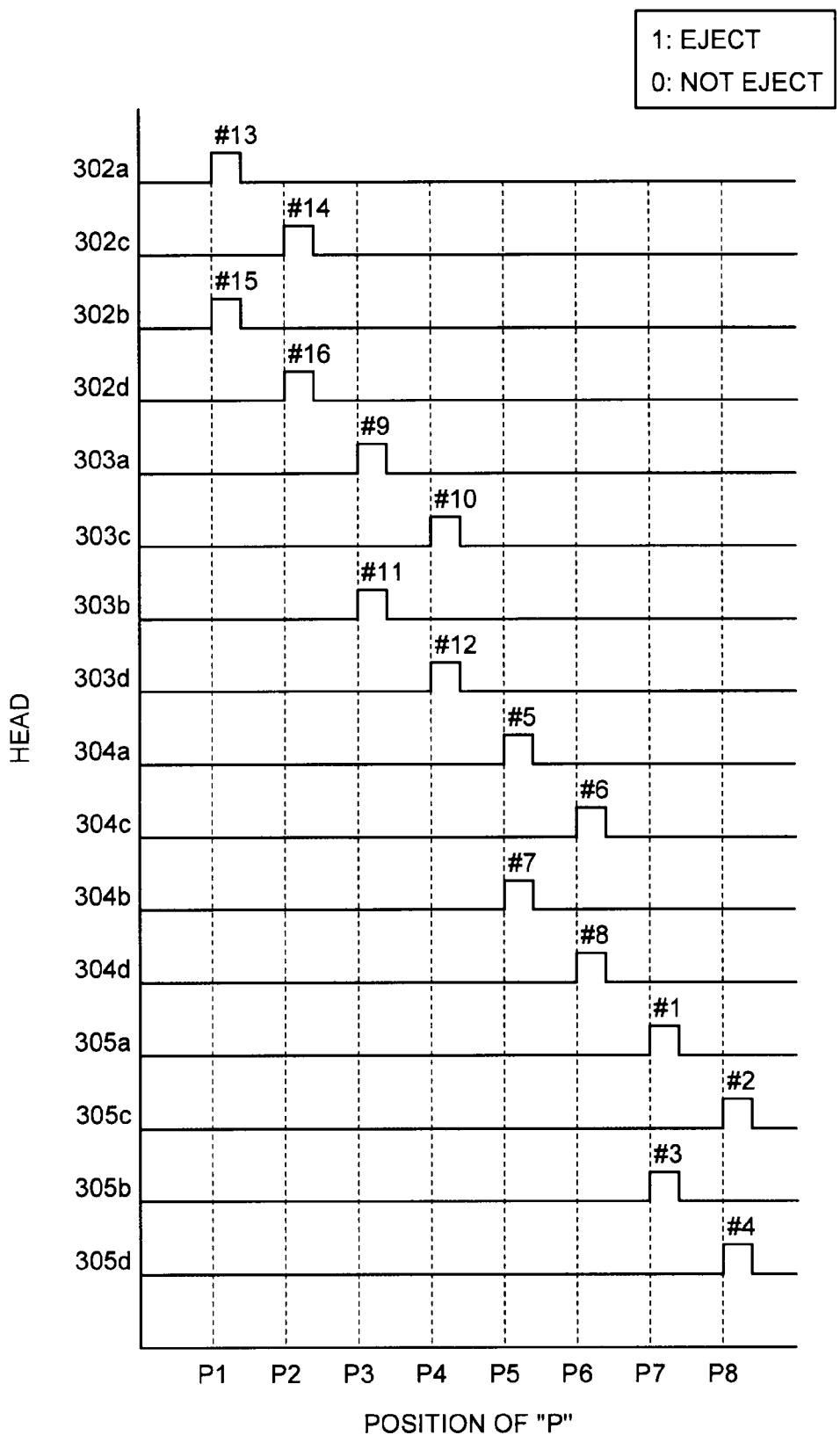
FIG. 21 is a timing chart illustrating an exemplary timing of ejecting ink from the head module according to the second embodiment.

FIG. 20 is a schematic diagram illustrating an exemplary relationship between the head modules 57a, 58a, 59a, and 60a and the image data 320 corresponding to one page to be printed. FIG. 21 is a timing chart illustrating an exemplary timing of ejecting ink from the head modules 57a, 58a, 59a, and 60a. Incidentally, the contents of FIG. 20 and FIG. 21 are simplified for the explanation. Therefore, the relationship between the head modules and the image data, or the timing of ejecting ink from respective head modules is not limited to these examples. Also, the contents of FIG. 20 and FIG. 21 are applicable to the head modules 57b, 58b, 59b, and 60b, the head modules 57c, 58c, 59c, and 60c, and the head modules 57d, 58d, 59d, and 60d. Therefore, the explanations thereof are omitted.

In the example shown in FIG. 20, the head module 57a has heads 302a, 302b, 302c, and 302d. Each head (302a, 302b, 302c, or 302d) has a nozzle (312a, 312b, 312c, or 312d) which is a hole provided at the center thereof. Each head (302a, 302b, 302c, or 302d) can form one pixel on the printing paper sheet 300 by ejecting ink once from each nozzle (312a, 312b, 312c, or 312d). The head modules 58a, 59a, and 60a have the same configuration. Specifically, the head module 58a has heads 303a, 303b, 303c, and 303d each having a nozzle which is a hole provided at the center thereof. The head module 59a has heads 304a, 304b, 304 c, and 304d each having a nozzle which is a hole provided at the center thereof. The head module 60a has heads 305a, 305b, 305c, and 305d each having a nozzle which is a hole provided at the center thereof.

The denotations P1 to P8 refer to various positions of P when the printing paper sheet 300 is conveyed in a direction indicated by an arrow "a" by the conveyance control unit 51. At these positions, the ink ejection is performed at least from any of heads.

In the timing chart shown in FIG. 21, the vertical axis refers to respective heads, and the horizontal axis refers to the position of P. The ejection timings from respective heads when P is located at P1 to P8 are represented as square waves.

Specifically, when P is located at P1, the head 302a and the head 302b overlap with the pixel #13 and the pixel #15 of the fourth raster, respectively (see FIG. 20). This timing is the ejection timing, and the conveyance control unit 51 (explained later) sends the ejection trigger signal to the head module 57a. Thereby, the head module 57a requests the output control unit 55a to transfer the ejection data of the heads 302a, 302b which are the first ejection data (P=P1). The head module 57a causes the heads 302a, 302b to eject ink on the basis of the ejection data transferred from the output control unit 55a (see FIG. 21). Incidentally, the ejection data transferred from the output control unit 55a at this time are the pixels #13, #15.

Subsequently, when P is located at P2, the heads 302c, 302d overlap with the pixels #14, #16 of the fourth raster, respectively (see FIG. 20). This timing is the ejection timing, and the conveyance control unit 51 (explained later) sends the ejection trigger signal to the head module 57a. Thereby, the head module 57a requests the output control unit 55a to transfer the ejection data of the heads 302c, 302d which are the second ejection data (P=P2). The head module 57a causes the heads 302c, 302d to eject ink on the basis of the ejection data transferred from the output control unit 55a (see FIG. 21). Incidentally, the ejection data transferred from the output control unit 55a at this time are the pixels #14, #16.

Subsequently, when P is located at P3, the heads 303a, 303b overlap with the pixels #9, #11 of the third raster, respectively (see FIG. 20). This timing is the ejection timing, and the conveyance control unit 51(*explained* later) sends the ejection trigger signal to the head module 58a. Thereby, the head module 58a requests the output control unit 55a to transfer the ejection data of the heads 303a, 303b which are the third ejection data (P=P3). The head module 58a causes the heads 303a, 303b to eject ink on the basis of the ejection data transferred from the output control unit 55a (see FIG. 21). Incidentally, the ejection data transferred from the output control unit 55a at this time are the pixels #9, #11.

Subsequently, when P is located at P4, the heads 303c, 303d overlap with the pixels #10, #12 of the third raster, respectively (see FIG. 20). This timing is the ejection timing, and the conveyance control unit 51 (explained later) sends the ejection trigger signal to the head module 58a. Thereby, the head module 58a requests the output control unit 55a to transfer the ejection data of the heads 303c, 303d which are the fourth ejection data (P=P4). The head module 58a causes the heads 303c, 303d to eject ink on the basis of the ejection data transferred from the output control unit 55 (see FIG. 21). Incidentally, the ejection data transferred from the output control unit 55a at this time are the pixels #10, #12.

Subsequently, when P is located at P5, the heads 304a, 304b overlap with the pixels #5, #7 of the second raster, respectively (see FIG. 20). This timing is the ejection timing, and the conveyance control unit 51(*explained* later) sends the ejection trigger signal to the head module 59a. Thereby, the head module 59a requests the output control unit 55a to transfer the ejection data of the heads 304a, 304b which are the fifth ejection data (P=P5). The head module 59a causes the heads 304a, 304b to eject ink on the basis of the ejection data transferred from the output control unit 55a (see FIG. 21). Incidentally, the ejection data transferred from the output control unit 55a at this time are the pixels #5, #7.

Subsequently, when P is located at P6, the heads 304c, 304d overlap with the pixels #6, #8 of the second raster, respectively (see FIG. 20). This timing is the ejection timing, and the conveyance control unit 51 sends the ejection trigger signal to the head module 59a. Thereby, the head module 59a requests the output control unit 55a to transfer the ejection data of the heads 304c, 304d which are the sixth ejection data (P=P6). The head module 59a causes the heads 304c, 304d to eject ink on the basis of the ejection data transferred from the output control unit 55a (see FIG. 21). Incidentally, the ejection data transferred from the output control unit 55a at this time are the pixels #6, #8.

Subsequently, when P is located at P7, the heads 305a, 305b overlap with the pixels #1, #3 of the first raster, respectively (see FIG. 20). This timing is the ejection timing, and the conveyance control unit 51 (explained later) sends the ejection trigger signal to the head module 60a. Thereby, the head module 60a requests the output control unit 55a to transfer the ejection data of the heads 305a, 305b which are the seventh ejection data (P=P7). The head module 60a causes the heads 305a, 305b to eject ink on the basis of the ejection data transferred from the output control unit 55a (see FIG. 21). Incidentally, the ejection data transferred from the output control unit 55a at this time are the pixels #1, #3.

Subsequently, when P is located at P8, the heads 305c, 305d overlap with the pixels #2, #4 of the first raster, respectively (see FIG. 20). This timing is the ejection timing, and the conveyance control unit 51 sends the ejection trigger signal to the head module 60a. Thereby, the head module 60a requests the output control unit 55a to transfer the ejection data of the heads 305c, 305d which are the eighth ejection data (P=P8). The head module 60a causes the heads 305c, 305d to eject ink on the basis of the ejection data transferred from the output control unit 55a (see FIG. 21). Incidentally, the ejection data transferred from the output control unit 55a at this time are the pixels #2, #4.

The output control unit 55a, to which the data line 32a and the data lines 62a, 63a, 64a, and 65a are connected, has a buffer 56a. The output control unit 55a requests the data transfer control units 30a to transfer the image data in the pixel order in accordance with the ink ejection order determined depending on the installation number of printer engines mounted on the printing device 13. Then, the output control unit 55a transfers the image data, which have been transferred in the requested pixel order, in the corresponding pixel order to the corresponding head modules from among the head modules 57a, 58a, 59a, and 60a to eject ink on the printing paper sheet.

Specifically, when received the memory storage report from the data transfer control unit 30a, the output control unit 55a requests the data transfer control unit 30a, from which the report was sent, to transfer the image data in the pixel order in accordance with the ink ejection order determined depending on the installation number of printer engines, and stores the pixels transferred in the requested pixel order sequentially into the buffer 56a. Then, in response to the transfer request from the corresponding head from among the head modules 57a, 58a, 59a, and 60a, the output control unit 55a transfers the image data stored in the buffer 56a to the corresponding head module, in the pixel order transferred from the data transfer control unit.

Incidentally, similarly to the first embodiment, the output control unit 55a is realized by FPGA (Field Programmable Gate Array). The circuit configuration of the FPGA is switchable to the circuit configuration corresponding to the installation number of printer engines. Specifically, in the second embodiment, the circuit configuration of the FPGA is the circuit configuration corresponding to the case that the installation number of printer engine is four.

In this case, the output control unit 55a sets the connection such that the data line 32a is connected with the head modules

57a, 58a, 59a, and 60a for color C. Thereby, the data transfer control unit 30a corresponds to the head modules 57a, 58a, 59a, and 60a. Also in this case, the output control unit 55a sets the ink ejection order such that the ink ejection is performed by four head modules for one color, as the ink ejection order in the case that the installation number of the printer engine is four.

FIGS. 22A to 22H illustrate an exemplary transfer order of the image data in the second embodiment. These figures illustrate the transfer order for causing the head module 57a, 58a, 59a, and 60a to eject ink in the ink ejection order as explained with FIG. 20 and FIG. 21. Incidentally, the contents illustrated in FIGS. 22A to 22H are simplified for the explanation. Therefore, the transfer order is not limited to this example. Herein, as shown in FIGS. 22A to 22H, the pixels #1 to #16 composing the image data 320 (see FIG. 20) are stored in the memory 31a. Also in the example shown in FIGS. 22A to 22H, the ink ejection order illustrated by the timing chart of FIG. 21 is set to the output control unit 55a as the ink ejection order in the case that the installation number of printer engines is four.

Figure 22A:
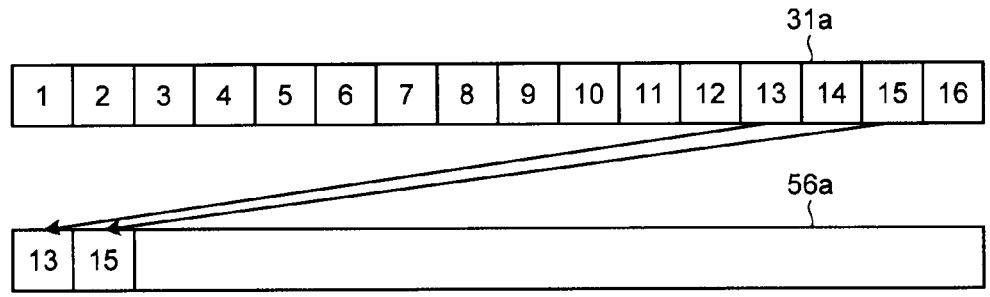
FIG. 22A is a diagram illustrating an exemplary transfer sequence of the image data according to the second embodiment.

In this case, firstly, the output control unit 55a requests the data transfer control unit 30a to transfer the pixels #13, #15, for which the ink is ejected at the timing when P is located P1 (see FIG. 21), and stores into the buffer 56a the pixels #13, #15, which the data transfer control unit 30a read out from the memory 31a and transferred to the control unit 55a, as shown in FIG. 22A.

Figure 22B:
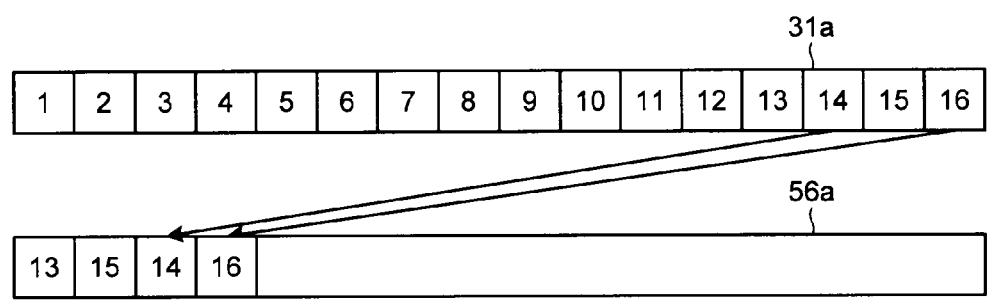
FIG. 22B is a diagram illustrating an exemplary transfer sequence of the image data according to the second embodiment.

Subsequently, the output control unit 55a requests the data transfer control unit 30a to transfer the pixels #14, #16 for which the ink is ejected at the timing when P is located P2 (see FIG. 21), and stores into the buffer 56a the pixels #14, #16, which the data transfer control unit 30a read out from the memory 31a and transferred to the control unit 55a, as shown in FIG. 22B.

Figure 22C:
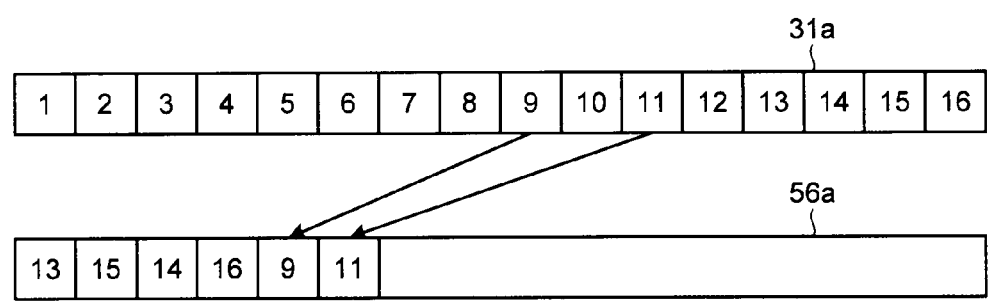
FIG. 22C is a diagram illustrating an exemplary transfer sequence of the image data according to the second embodiment.

Subsequently, the output control unit 55a requests the data transfer control unit 30a to transfer the pixels #9, #11 for which the ink is ejected at the timing when P is located P3 (see FIG. 21), and stores into the buffer 56a the pixels #9, #11 which the data transfer control unit 30a read out from the memory 31a and transferred to the control unit 55a, as shown in FIG. 22C.

Figure 22D:
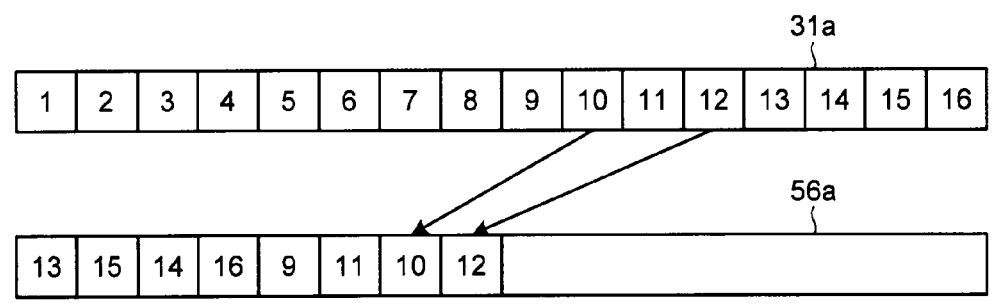
FIG. 22D is a diagram illustrating an exemplary transfer sequence of the image data according to the second embodiment.

Subsequently, the output control unit 55a requests the data transfer control unit 30a to transfer the pixels #10, #12 for which the ink is ejected at the timing when P is located P4 (see FIG. 21), and stores into the buffer 56a the pixels #10, #12 which the data transfer control unit 30a read out from the memory 31a and transferred to the control unit 55a, as shown in FIG. 22D.

Figure 22E:
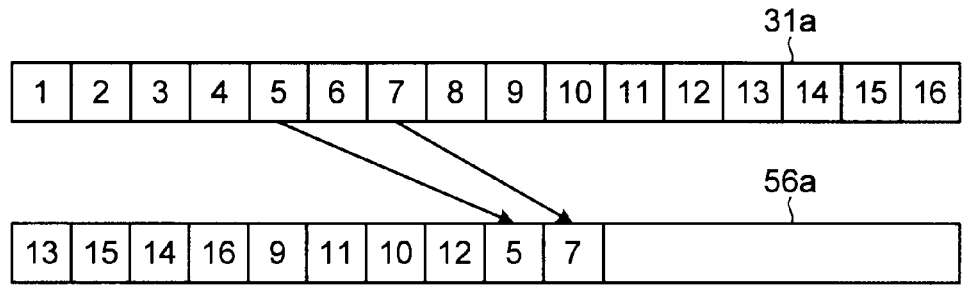
FIG. 22E is a diagram illustrating an exemplary transfer sequence of the image data according to the second embodiment.

Subsequently, the output control unit 55a requests the data transfer control unit 30a to transfer the pixels #5, #7 for which the ink is ejected at the timing when P is located P5 (see FIG. 21), and stores into the buffer 56a the pixels #5, #7, which the data transfer control unit 30a read out from the memory 31a and transferred to the control unit 55a, as shown in FIG. 22E.

Figure 22F:
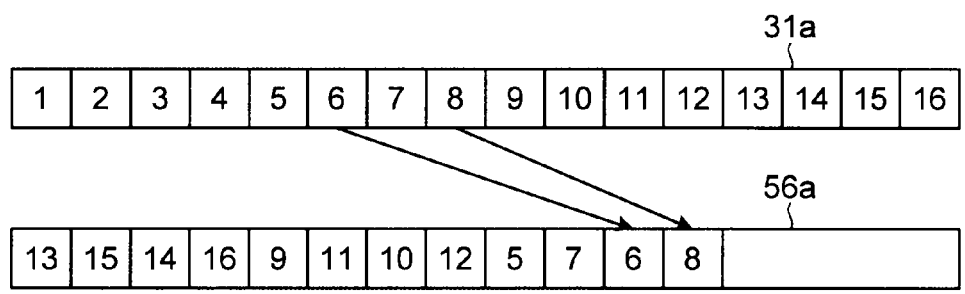
FIG. 22F is a diagram illustrating an exemplary transfer sequence of the image data according to the second embodiment.

Subsequently, the output control unit 55a requests the data transfer control unit 30a to transfer the pixels #6, #8 for which the ink is ejected at the timing when P is located P6 (see FIG. 21), and stores into the buffer 56a the pixels #6, #8, which the data transfer control unit 30a read out from the memory 31a and transferred to the control unit 55a, as shown in FIG. 22F.

Figure 22G:
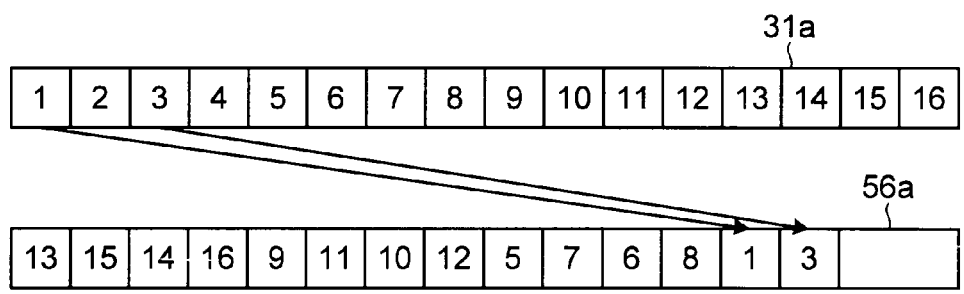
FIG. 22G is a diagram illustrating an exemplary transfer sequence of the image data according to the second embodiment.

Subsequently, the output control unit 55a requests the data transfer control unit 30a to transfer the pixels #1, #3 for which the ink is ejected at the timing when P is located P7 (see FIG. 21), and stores into the buffer 56a the pixels #1, #3, which the data transfer control unit 30a read out from the memory 31a and transferred to the control unit 55a, as shown in FIG. 22G.

Figure 22H:
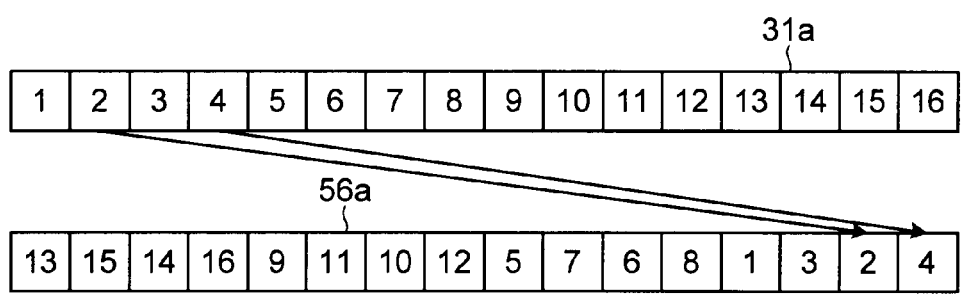
FIG. 22H is a diagram illustrating an exemplary transfer sequence of the image data according to the second embodiment.

Subsequently, the output control unit 55a requests the data transfer control unit 30a to transfer the pixels #2, #4 for which the ink is ejected at the timing when P is located P8 (see FIG. 21), and stores into the buffer 56a the pixels #2, #4, which the data transfer control unit 30a read out from the memory 31a and transferred to the control unit 55a, as shown in FIG. 22H.

The image data thus stored in the buffer 56a is transferred sequentially to the head modules 57a, 58a, 59a, and 60a, in response to the transfer request from the head modules 57a, 58a, 59a, and 60a.

Figure 23:
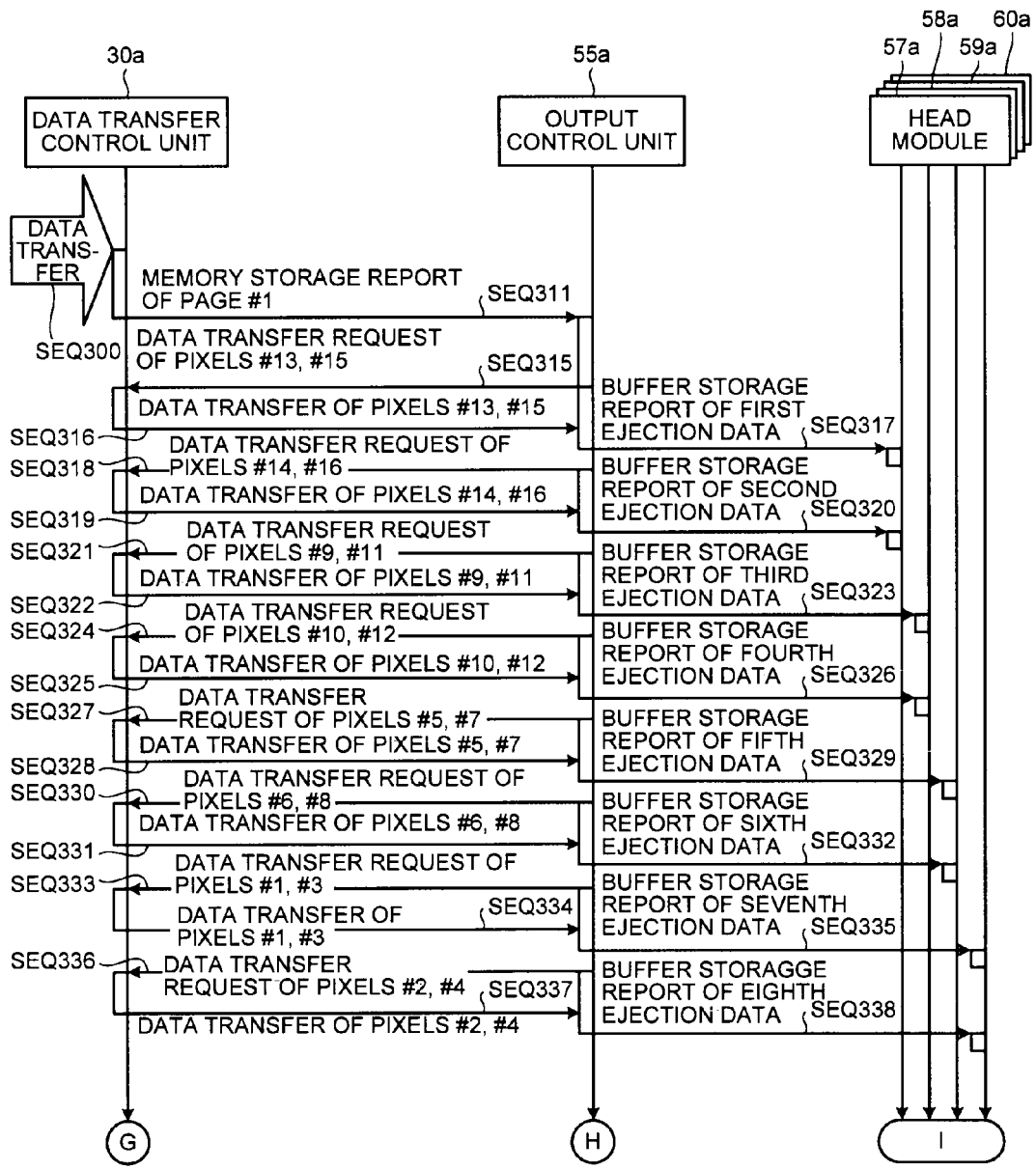
FIG. 23 is a sequence diagram specifically illustrating an example of a process at SEQ119a in FIG. 14 according to the second embodiment of the present invention.
Figure 24:
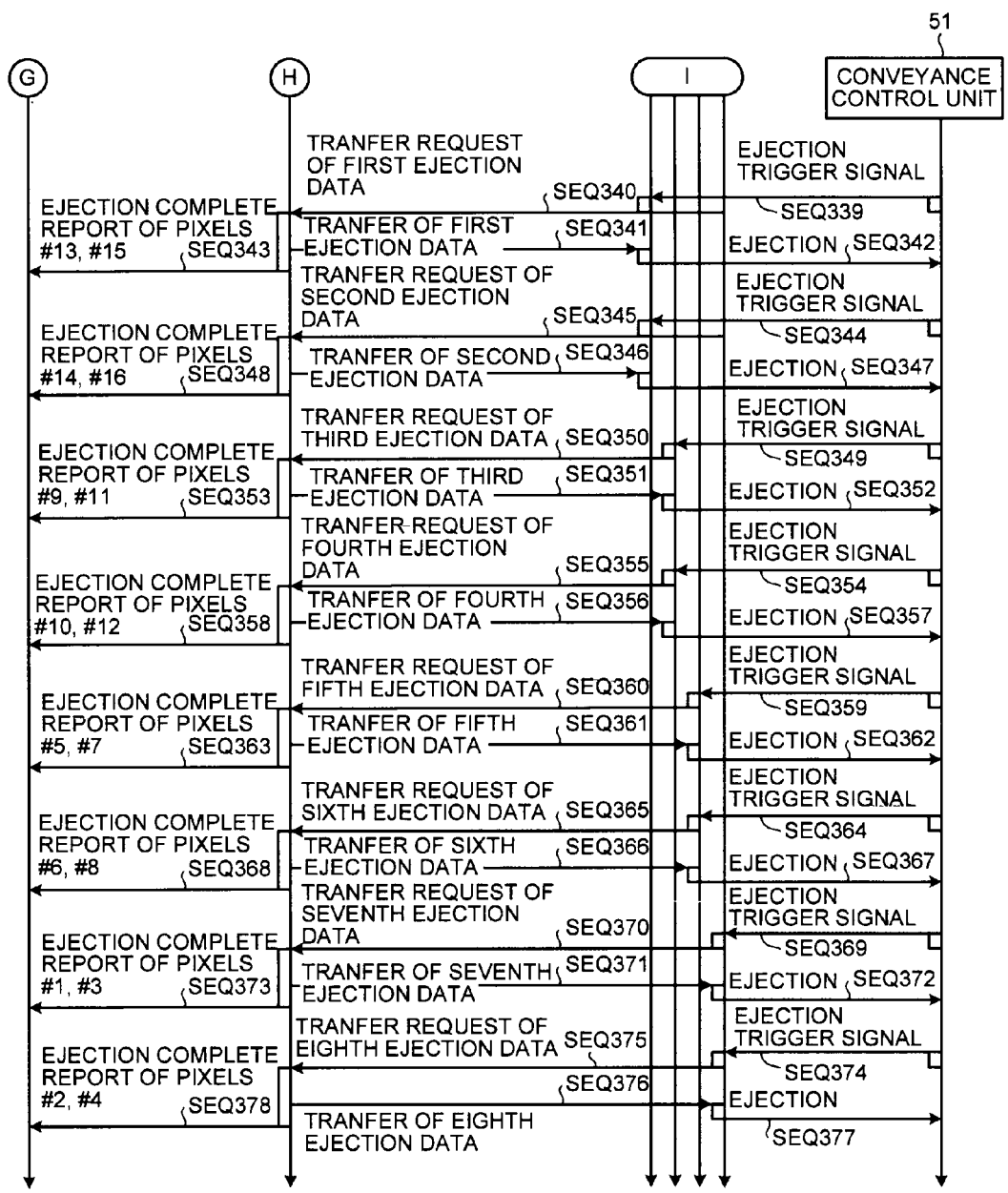
FIG. 24 is a sequence diagram specifically illustrating an example of a process at SEQ119a in FIG. 14 according to the second embodiment of the present invention.

FIG. 23 and FIG. 24 are a series of sequence diagrams illustrating an exemplary processing of SEQ119a in FIG. 14 in the second embodiment. These figures show a sequence in a case for the image data transfer order explained with FIGS. 22A to 22H, as well as the ink ejection order explained with FIG. 20 and FIG. 21. Incidentally, in FIGS. 23 and 24, reference numerals G to I indicate that the process proceeds to the corresponding reference numerals between the different drawings.

First, the data transfer control unit 30a sends a memory storage report for color C of the first page (page #1) to the output control unit 55a (SEQ311), when the image data for color C of the first page is transferred from the upper level device 10 (SEQ300) and the transferred image data for color C of the first page is completely stored into the memory 31a.

Subsequently, the output control unit 55a requests the data transfer control unit 30a to transfer the data of pixels #13, #15, which are the first ejection data from the head module 57a (SEQ315). The data of pixels #13, #15 are read out from the memory 31a and transferred by the data transfer control unit 30a and stored into the buffer 56a by the output control unit 55a (SEQ316). Then, after the data of pixels #13, #15 are stored into the buffer 56a, the output control unit 55a sends a buffer storage report of the first ejection data to the head module 57a (SEQ317).

Hereinafter, the output control unit 55a repeats the same processing as SEQ315 to SEQ317, as for the second ejection data (P=P2) from the head module 57a, the third to fourth ejection data (P=P3 to P4) from the head module 58a, the fifth to sixth ejection data (P=P5 to P6) from the head module 59a, and the seventh to eighth ejection data (P=P7 to P8) from the head module 60a (SEQ318 to SEQ338).

Subsequently, referring to FIG. 24, the head module 57a requests the output control unit 55a to transfer the first ejection data (SEQ340), once the conveyance control unit 51 conveys the printing paper sheet so that P is located at P1 and the conveyance control unit 51 sends the first ejection trigger signal to the head module 57a (SEQ339). Then, the head module 57a causes the corresponding head to eject ink on the basis of the first ejection data read out from the buffer 56a and transferred by the output control unit 55a (SEQ341, SEQ342). Also, the output control unit 55a sends an ejection complete report about pixels #13, #15 to the data transfer control unit 30a, when the transfer to the head module 57a is completed (SEQ343).

Hereinafter, the head module 57a and the output control unit 55a repeat the same processing as SEQ339 to SEQ343, as for the second ejection data (P=P2) from the head module 57a (SEQ344 to SEQ348).

Similarly, the head module 58a and the output control unit 55a repeat the same processing as SEQ339 to SEQ343, as for the third to fourth ejection data (P=P3 to P4) from the head module 58a (SEQ349 to SEQ358).

Similarly, the head module 59a and the output control unit 55a repeat the same processing as SEQ339 to SEQ343, as for the fifth to sixth ejection data (P=P5 to P6) from the head module 59a (SEQ359 to SEQ368).

Similarly, the head module 60a and the output control unit 55a repeat the same processing as SEQ339 to SEQ343, as for the seventh to eighth ejection data (P=P7 to P8) from the head module 60a (SEQ369 to SEQ378).

In the printing device 13 as in the first and second embodiments, the output control unit is disposed between the data transfer control unit and the head module in the printer engine. Thereby, the output control unit controls the rearrangement pattern of the image data corresponding to the installation number of printer engines. This rearrangement pattern of the image data can be switched by the output control unit, in accordance with the ink ejection order determined depending on the installation number of printer engines, specifically in accordance with the ink ejection order determined depending on the number of head modules for one color determined depending on the installation number of printer engines. The data transfer control unit does not rearrange the image data in the ejection order to transfer the image data to the output control unit. Instead, the output control unit requests the data transfer control unit to transfer the image data (pixel data) to be ejected, and the data transfer control unit reads out the requested image data from the memory and transfer the read data to the output control unit. Therefore, according to the first and second embodiments, since the data transfer control unit does not relate to the rearrangement of the image data, there is no need to remake or adapt the data transfer control unit even if the installation number of printer engines is changed. Furthermore, since the rearrangement pattern of the image data can be switched by the output control unit depending on the number of head modules for one color, there is no need to remake or adapt the output control unit even if the installation number of printer engines is changed. Thus, according to the first and second embodiments, there is no need to remake or adapt the data transfer control unit or the output control unit. Therefore, it is possible to provide the printer engine with the improved scalability, and thereby provide the printing device with improved scalability.

Third Embodiment

In the first and second embodiments, the ink ejection order that is a basis of the rearrangement pattern of the image data is predetermined in accordance with the installation number of printer engines, i.e. in accordance with the number of head modules for one color determined depending on the installation number of printer engines. In the third embodiment, however, the ink ejection order is determined in accordance with a factor other than the installation number of printer engines, for example in accordance with the specification of the head module. And, the image data is rearranged by the output control unit, in accordance with the ink ejection order.

The basic configuration of the printing system according to the third embodiment is the same as the first embodiment explained with FIG. 1 to FIG. 8. Therefore, the third embodiment shows an example in which one printer engine is mounted on the printing device, similarly to the first embodiment.

In the third embodiment, the transfer management table is used. The transfer management table is used to manage a data transfer process in the data transfer control units 30a to 30d, and to manage a printing process in the image output unit 50. In the printing device controller 14, the control unit 23 generates and holds the transfer management table, on the basis of a print job transmitted from the upper level device 10, the paper information, and the information indicating the printing conditions described using FIG. 13. Specifically, the CPU 321 generates the transfer management table and stores the transfer management table in the RAM 323.

When the control unit 23 outputs the data transfer start request or the printing instruction to the data transfer control units 30a to 30d, the control unit 23 holds needed information from among the information of the transfer management table in the data transfer control units 30a to 30d. For example, the control unit 23 transmits the information from the control signal transmitting/receiving unit 21 to the data transfer control units 30a to 30d through the engine I/F control lines 40a to 40d, and the information is written in the storage unit of the data transfer control units 30a to 30d, such as registers.

A specific example will be described using the data transfer control unit 30a. The control unit 23 transmits needed information among the information of the transfer management table from the control signal transmitting/receiving unit 21 to the data transfer control unit 30a through the engine I/F control line 40a, and the information is written in a register of a logic circuit 32a (data transfer control unit controller 135a) in the data transfer control unit 30a.

The data transfer control units 30a to 30d output the transmission request of the print image data to the upper level device 10 or the printing instruction to the image output unit 50, according to the information of the transfer management table written in the registers. A page identifier to identify a page is included in the transfer management table, and the data transfer control units 30a to 30d select the information of the transfer management table on the basis of the page identifier and execute the data transfer and the printing process.

FIG. 25 illustrates an example of the transfer management table that is applied to the third embodiment. The transfer management table includes information that is common to the colors C, M, Y, and K and information for each color. The information common to each color and the information for each color include data transfer information that is used to transmit the print image data from the upper level device 10 and print information that is information related to the printing instruction with respect to the image output unit 50. A management form of each information that is included in the transfer management table is not limited to a table form and each information may be managed in another data management form.

The information common to each color in the third embodiment will be described. As shown in FIG. 25, in the transfer management table according to the third embodiment, the information common to each color includes a page identifier PBID and a data amount for each page, and further includes, as printing information, resolution, gradation, a paper feeding length, a paper width, and a printing surface (surface/back surface). Since the data size of the print image data to be transferred is different for each color, the information common to each color does not include the data transfer information.

The information for each color in the third embodiment will be described. The information for each color includes the color identifier, the data transfer information, and the printing information. The data transfer information in the information for each color applicable to the third embodiment includes the data transfer necessity, the data transfer origin address, the data transfer destination address, and the data transfer size.

The printing information in the information for each color applicable to the third embodiment includes the printing necessity, the printing prohibited areas (upper side, lower side, left side, and right side), and the image information.

The image information includes the X direction effective size and the Y direction effective size.

Figure 26:
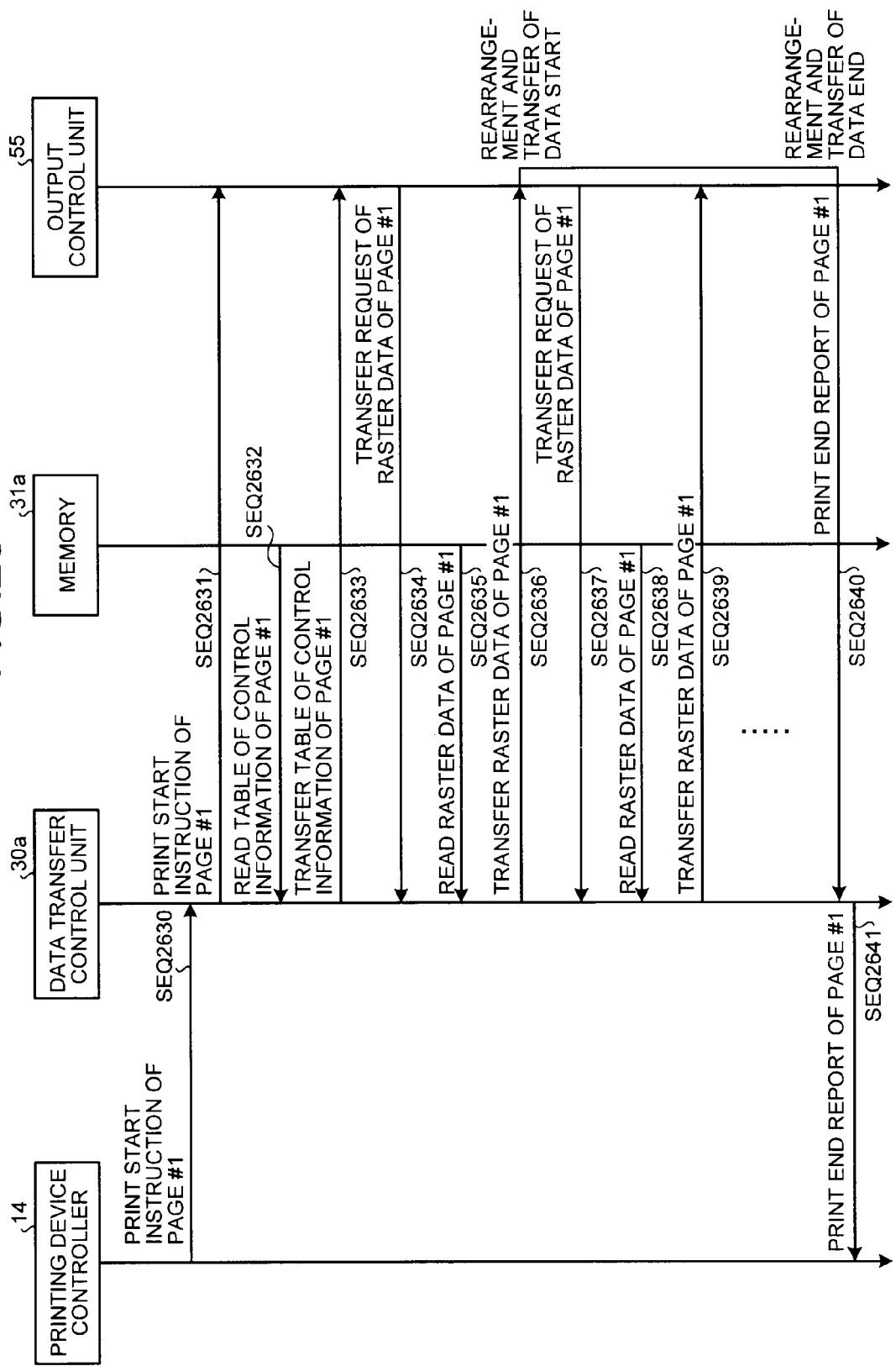
FIG. 26 is a sequence diagram illustrating an exemplary communication between the data transfer control unit and a control unit based on the transfer management table according to the third embodiment of the present invention.

FIG. 26 is a sequence diagram illustrating an exemplary communication between the data transfer control unit 30a and the control unit 23 by using the transfer management table. FIG. 26 shows the processing after SEQ114 shown in FIG. 14 with focusing on the transfer management table and the data flow. In this example, the explanation is limited to one color.

First, the printing device controller 14 sends an instruction to start the printing of page #1 to the data transfer control unit 30a (SEQ2630). When received the instruction to start the printing of page #1, the data transfer control unit 30a also sends an instruction to start the printing of page #1 to the output control unit 55 (SEQ2631). Furthermore, the data transfer control unit 30a reads out the transfer management table of page #1 from the memory 31a (SEQ2632) and transfers the read transfer management table of page #1 to the output control unit 55 (SEQ2633). Since the transfer management tables of the print target pages are transferred in the printing order from the data transfer control unit 30a to the output control unit 55, the output control unit 55 does not need to manage all the transfer management table. Thereby, the control load thereof can be reduced.

Then, the output control unit 55 requests the data transfer control unit 30a to transfer the raster data of page #1 in the data utilize order, on the basis of the ink ejection order predetermined depending on the head shape or the like (SEQ2634). When received the transfer request, the data transfer control unit 30a reads out the required raster data from the memory 31a (SEQ2635), and transfers the read raster data to the output control unit 55 (SEQ2636).

When received the raster data, the output control unit 55 rearranges the raster data into the ink ejection order and then transfers it sequentially to the head module 57. The processing from SEQ2634 to SEQ2636 is performed also for the next raster data (SEQ2637 to SEQ2639). When all the raster data is completely transferred, the output control unit 55 sends a report that the printing of page #1 is completed to the data transfer control unit 30a (SEQ2640), and the data transfer control unit 30a also sends a report that the printing of page #1 is completed to the printing device controller 14 (SEQ2641).

Figure 27:
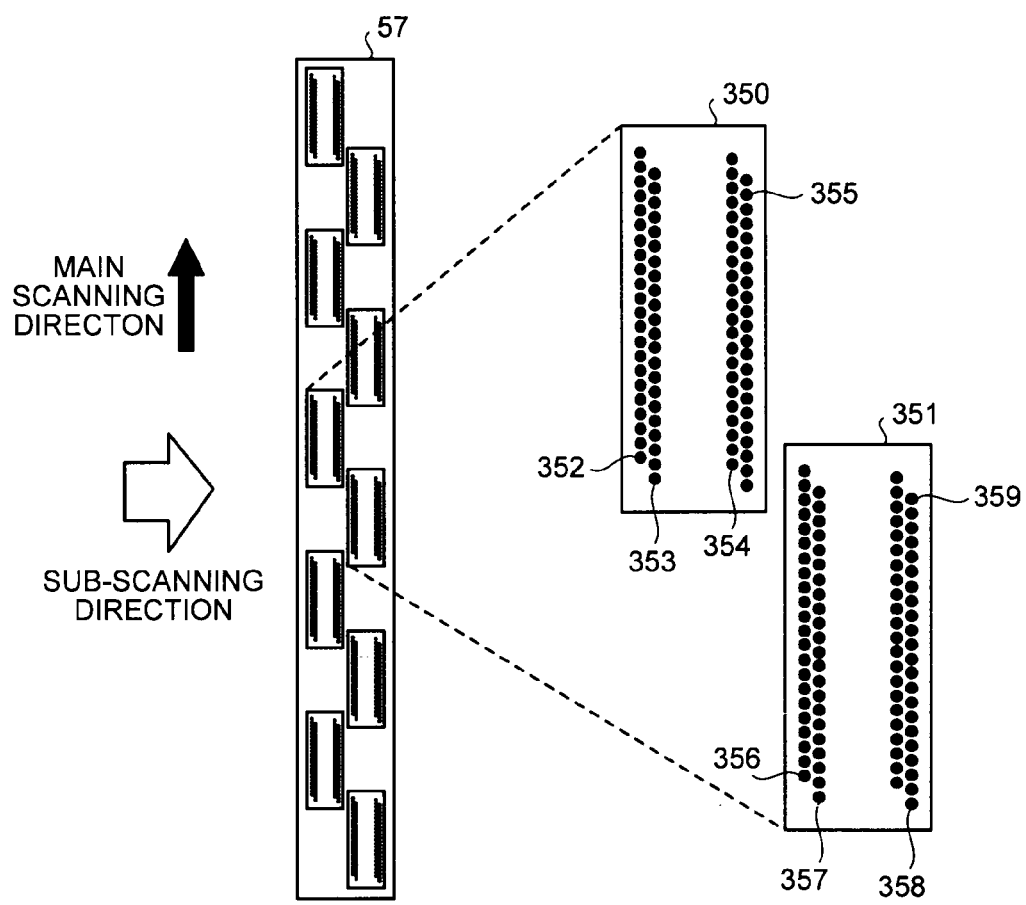
FIG. 27 is a schematic diagram illustrating a specific example of a head module according to the third embodiment of the present invention.

Next, an explanation will be made on the configuration of the head module in this embodiment. FIG. 27 specifically shows an exemplary configuration of the head module 57 in the third embodiment. In FIG. 27, an outlined white arrow indicates the conveyance direction of the paper sheet, that is, the sub scanning direction. And, a black solid arrow indicates the main scanning direction. Incidentally, other head modules have the same configuration as shown in FIG. 26.

A plurality of heads is arranged in a checker pattern such as the heads 350, 351 in each head module 57, 58, 59, 60. Each head 350, 351 has four rows of nozzles such as rows of nozzles 352 to 355. The rows of nozzles aligned in the main scanning direction eject ink at the same time.

Furthermore, for example, rows of nozzles arranged at the same position in respective heads, such as the row of nozzles 352 of the head 350, and the row of nozzles 356 of the head 351, forms the same straight line by printing. Thereby, respective head modules 57, 58, 59, and 60 can form one raster in such a manner that the printing is performed by the rows of nozzles aligned with the row of nozzles 352 in the main scanning direction, and then the printing is performed by the rows of nozzles aligned with the row of nozzles 356 in the main scanning direction with the timing of conveying the printing sheet adjusted.

At the output control unit 55, the ink ejection order from respective rows of nozzles is determined on the basis of the sheet conveyance speed or the interval of the rows of nozzles. Thereby, the ink ejection order is changed if the specification of the head modules 57, 58, 59, and 60 is changed.

FIGS. 28A to 28H shows exemplary timings of ejecting ink from respective rows of nozzles onto the printing paper sheet 385 by using the head module 57 shown in FIG. 27. FIGS. 28A to 28H show an example of printing an image data having 16 rasters.

Incidentally, as for the ejection order from respective rows of nozzles, it is assumed that respective rows of nozzles eject the "N"-th raster, the "N+2"-th raster, the "N+1"-th raster, and the "N+3"-th raster (N=1, 5, 9, 13), respectively, in this order from the left. In FIGS. 28A to 28H, the outlined white arrow indicates the conveyance direction of the sheet (that is, the sub scanning direction), and the black solid arrow indicates the main scanning direction.

Figure 28A:
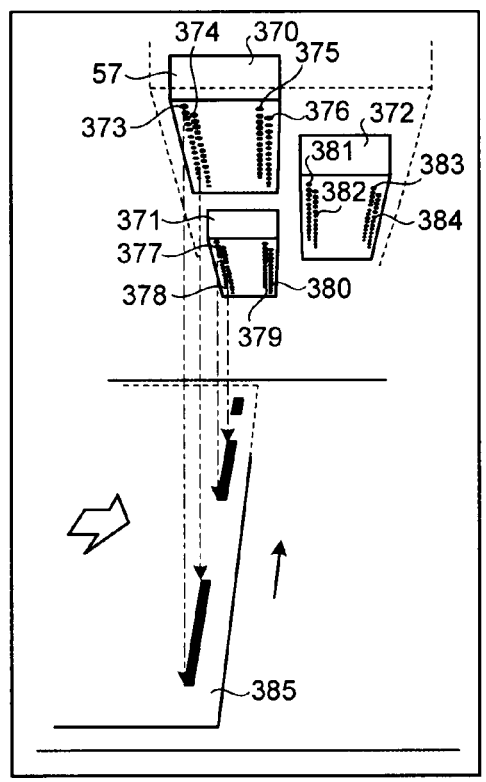
FIG. 28A is a schematic diagram illustrating an exemplary timing of ejecting ink sequentially from each row of nozzles.

In the timing shown in FIG. 28A, the rows of nozzles aligned with the row of nozzles 373 or the row of nozzles 377 in the main scanning direction eject the first raster. However, due to the checker-like head arrangement, the printing is partially performed at this time (there are areas where the printing is not performed).

Figure 28B:
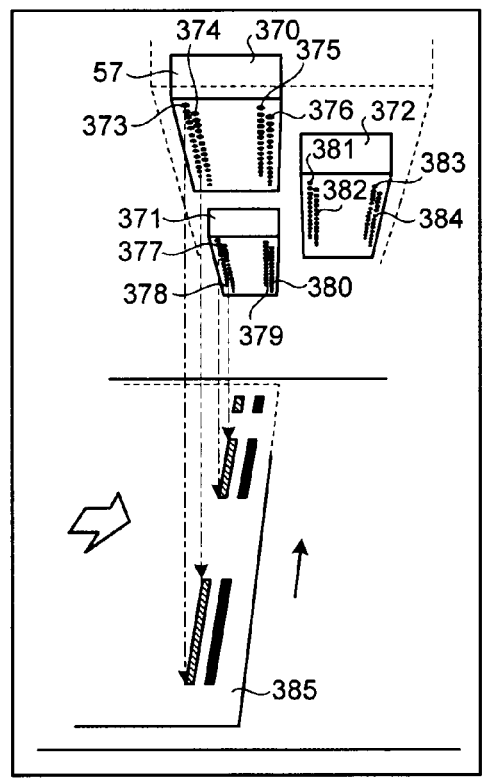
FIG. 28B is a schematic diagram illustrating an exemplary timing of ejecting ink sequentially from each row of nozzles.

In the timing shown in FIG. 28B, the rows of nozzles aligned with the row of nozzles 374 or the row of nozzles 378 in the main scanning direction eject ink onto the position corresponding to the third raster, after the first raster passes under the rows of nozzles.

Depending on the interval of rows of nozzles, the rows of nozzles aligned with the row of nozzles 373 or the row of nozzles 377 in the main scanning direction may start to eject the fifth or later raster sequentially. However, in the timing shown in FIG. 28B, it is assumed that the row of nozzles does not reach such a ejection point.

Figure 28C:
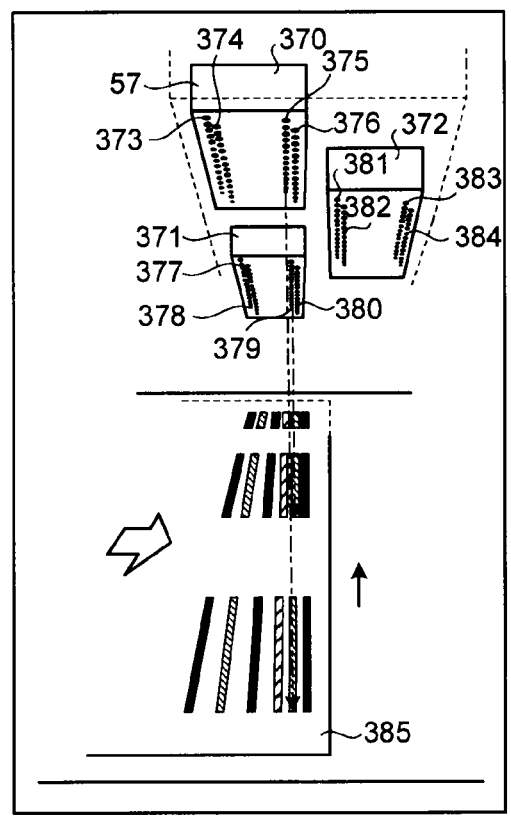
FIG. 28C is a schematic diagram illustrating an exemplary timing of ejecting ink sequentially from each row of nozzles.

In the timing shown in FIG. 28C, the rows of nozzles aligned with the row of nozzles 375 or the row of nozzles 379 in the main scanning direction eject the second raster. Also, until the timing shown in FIG. 28C, the rows of nozzles aligned with the row of nozzles 373 or the row of nozzles 377 in the main scanning direction eject the fifth and ninth rasters, and the rows of nozzles aligned with the row of nozzles 374 or the row of nozzles 378 in the main scanning direction eject the seventh raster.

Figure 28D:
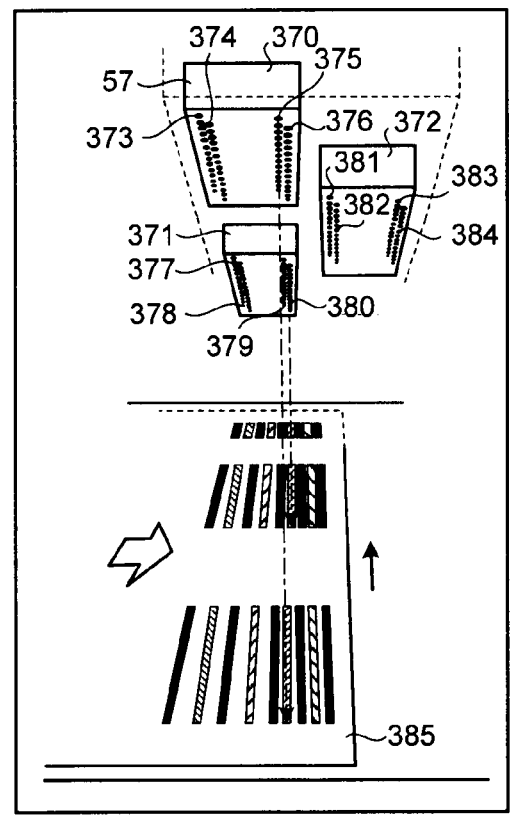
FIG. 28D is a schematic diagram illustrating an exemplary timing of ejecting ink sequentially from each row of nozzles.

In the timing shown in FIG. 28D, the rows of nozzles aligned with the row of nozzles 376 or the row of nozzles 380 in the main scanning direction eject the fourth raster. Also, until the timing shown in FIG. 28D, the rows of nozzles aligned with the row of nozzles 373 or the row of nozzles 377 in the main scanning direction eject the thirteenth raster, and the rows of nozzles aligned with the row of nozzles 374 or the row of nozzles 378 in the main scanning direction eject the eleventh raster.

Figure 28E:
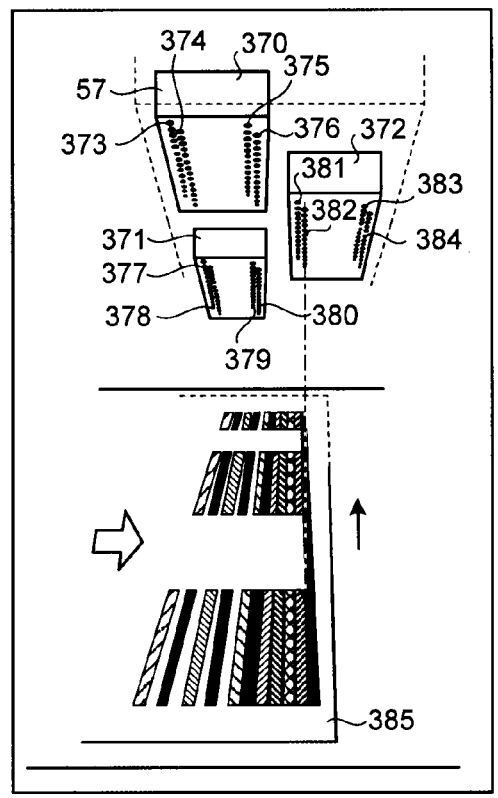
FIG. 28E is a schematic diagram illustrating an exemplary timing of ejecting ink sequentially from each row of nozzles.

In the timing shown in FIG. 28E, the rows of nozzles aligned with the row of nozzles 381 in the main scanning direction eject ink onto the remaining positions (not printed positions) of the first raster. At this time, the first raster is completely printed. Also, until the timing shown in FIG. 28E, the rows of nozzles aligned with the row of nozzles 374 or the row of nozzles 378 in the main scanning direction eject the fifteenth raster, and the rows of nozzles aligned with the row of nozzles 375 or the row of nozzles 379 in the main scanning direction eject the sixth raster.

Figure 28F:
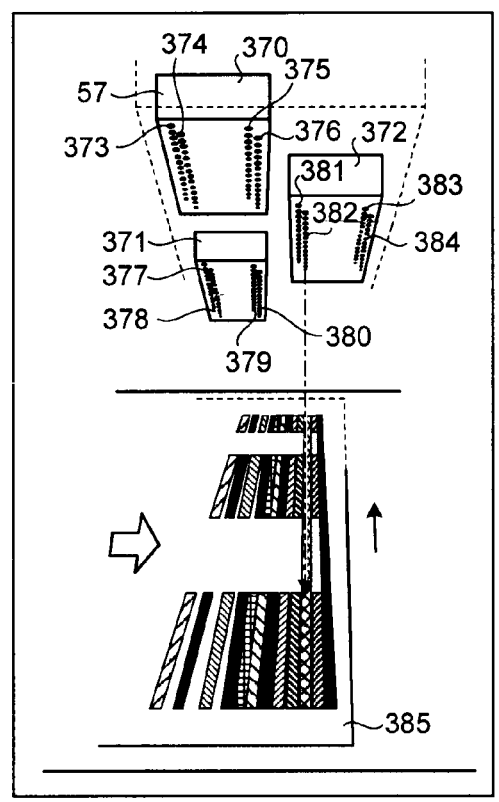
FIG. 28F is a schematic diagram illustrating an exemplary timing of ejecting ink sequentially from each row of nozzles.

In the timing shown in FIG. 28F, the rows of nozzles aligned with the row of nozzles 382 in the main scanning direction eject ink onto the remaining positions (not printed positions) of the third raster. At this time, the third raster is completely printed. Also, until the timing shown in FIG. 28F, the rows of nozzles aligned with the row of nozzles 376 or the row of nozzles 380 in the main scanning direction eject the eighth raster.

Figure 28G:
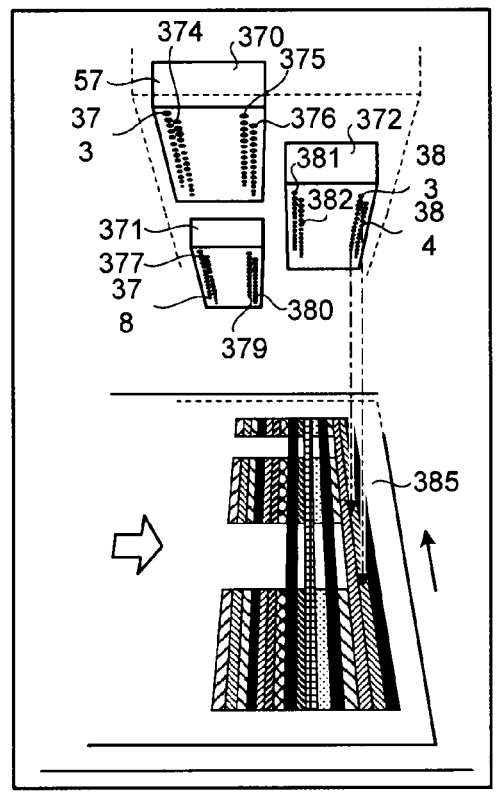
FIG. 28G is a schematic diagram illustrating an exemplary timing of ejecting ink sequentially from each row of nozzles.

In the timing shown in FIG. 28G, the rows of nozzles aligned with the row of nozzles 383 in the main scanning direction eject ink onto the remaining positions (not printed positions) of the second raster. At this time, the second raster is completely printed. Also, until the timing shown in FIG. 28G, the rows of nozzles aligned with the row of nozzles 375 or the row of nozzles 379 in the main scanning direction eject the tenth and fourteenth rasters, and the rows of nozzles aligned with the row of nozzles 376 or the row of nozzles 380 in the main scanning direction eject the twelfth and sixteenth rasters.

Similarly, the rows of nozzles aligned with the row of nozzles 381 in the main scanning direction eject ink onto the remaining positions (not printed positions) of the fifth and ninth rasters, and the rows of nozzles aligned with the row of nozzles 382 in the main scanning direction eject ink onto the remaining positions (not printed positions) of the eleventh raster. Thereby, the fifth, ninth, and eleventh rasters are completely printed.

Figure 28H:
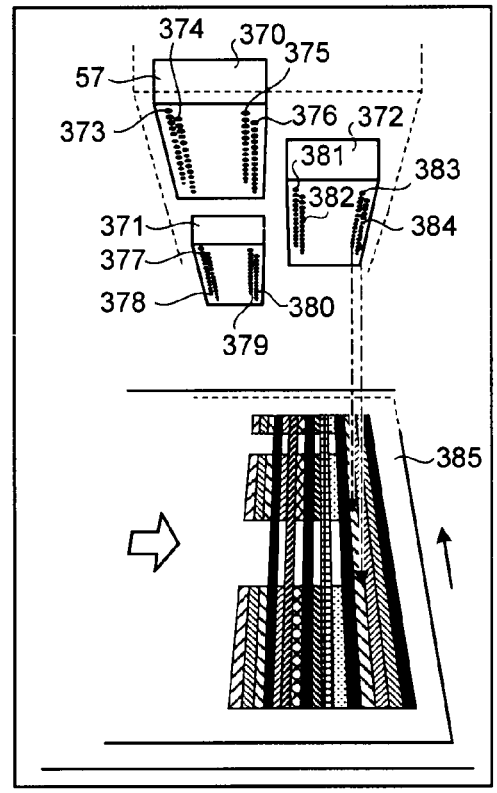
FIG. 28H is a schematic diagram illustrating an exemplary timing of ejecting ink sequentially from each row of nozzles.

In the timing shown in FIG. 28H, the rows of nozzles aligned with the row of nozzles 384 in the main scanning direction eject ink onto the remaining positions (not printed positions) of the fourth raster. At this time, the fourth raster is completely printed. Also, until the timing shown in FIG. 28H, the rows of nozzles aligned with the row of nozzles 381 in the main scanning direction eject ink onto the remaining positions (not printed positions) of the thirteenth raster, and the rows of nozzles aligned with the row of nozzles 382 in the main scanning direction eject ink onto the remaining positions (not printed positions) of the eleventh raster. Thereby, the eleventh and thirteenth rasters are completely printed.

Then, the rows of nozzles aligned with the row of nozzles 384 in the main scanning direction eject ink onto the remaining positions (not printed positions) of the sixteenth raster. At this time, the sixteenth raster is completely printed, and thereby the desired image is formed.

Figure 29:
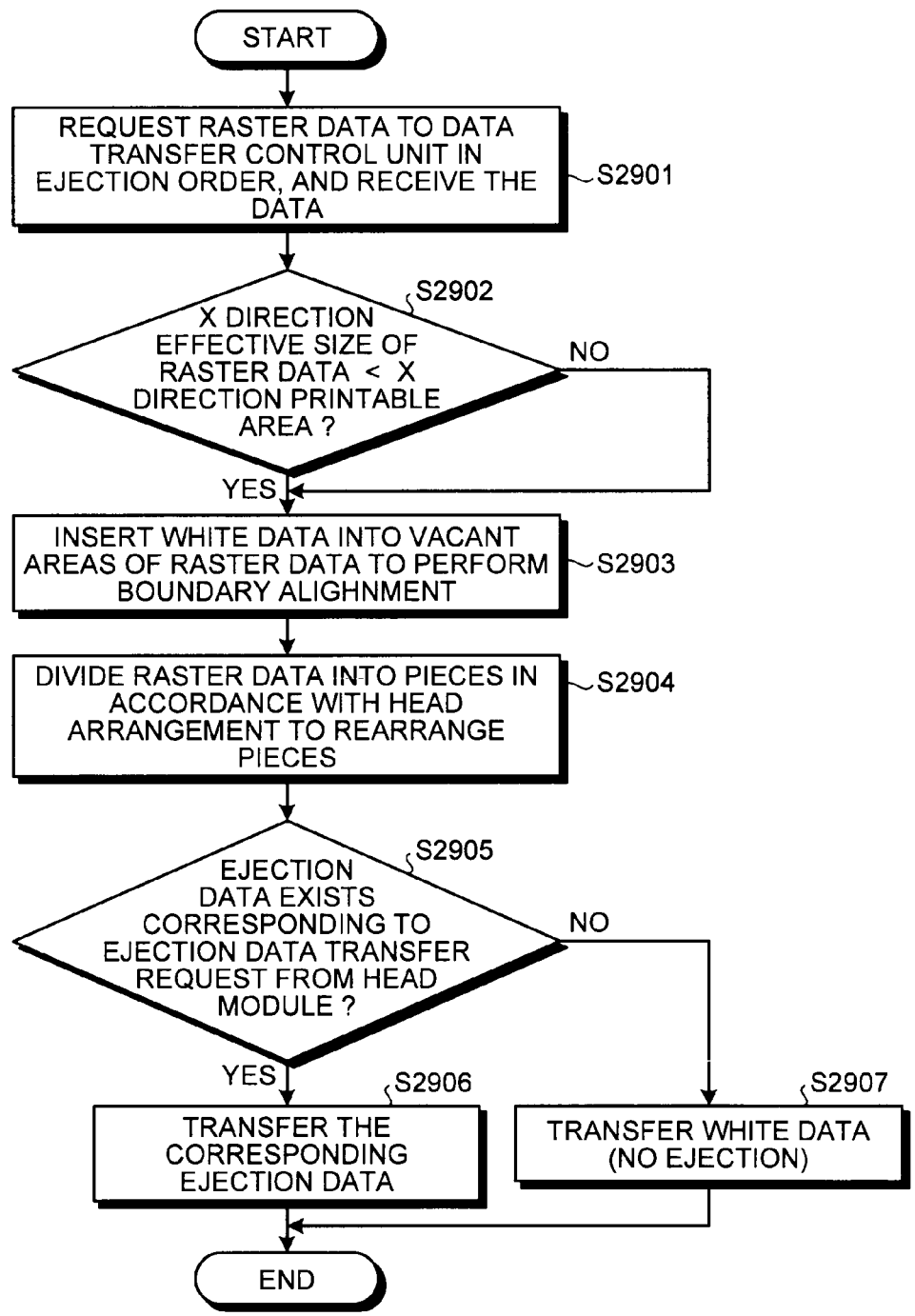
FIG. 29 is a flow chart illustrating a control process by an output control unit according to the third embodiment of the present invention.

Next, an explanation will be made on various processing including an insert of white data, the data rearrangement, an ejection data transfer to the head module 57, after the output control unit 55 receives the raster data from the data transfer control unit 30a, in order to perform the ink ejection as mentioned above. FIG. 29 is a flow chart illustrating a procedure of control process including the insert of white data, the data rearrangement, the ejection data transfer to the head module 57, after the output control unit 55 receives the raster data from the data transfer control unit 30a. FIG. 29 is for explaining a case that the output control unit 55 receives the raster data from the data transfer control unit 30a. However, the explanation is also applicable to cases that other data transfer control units 30b, 30c, and 30d receives the raster data.

The output control unit 55 requests the data transfer control unit 30a to transfer the raster data in the ejection order predetermined in accordance with the head shape, and receives the corresponding data from the data transfer control unit 30a (Step S2901).

Subsequently, the output control unit 55 confirms the X direction size of the received raster data, and inserts the white data. That is, the output control unit 55 refers the transfer management table to judge whether the X direction effective size of the raster data registered in the transfer management table is smaller than the X direction printable area (Step S2902). In this context, the "X direction printable area" represents {the "paper width"−[the "left side print prohibited area"+the "right side print prohibited area"]}. The paper width, the left side print prohibited area, and the right side print prohibited area are all registered in the transfer management table. Thereby, the output control unit 55 can obtain these information with reference to the transfer management table.

If the X direction effective size of the raster data is smaller than the X direction printable area (YES in Step S2902), the output control unit 55 inserts white data into the vacant areas of the raster data to perform the boundary alignment (Step S2903).

The head module 57 in which the heads are arranged in the checker pattern cannot eject at one time a whole line of raster data after the boundary alignment. Thereby, the output control unit 55 divides the raster data into pieces in accordance with the head arrangement and rearranges the pieces at every ejection timing (Step S2904).

Upon receiving the ejection trigger signal from the conveyance control unit 51 as the trigger, the head module 57 requests the output control unit 55 to transfer the ejection data, and the output control unit 55 transfers the rearranged data to the head module 57, in response to the request of transferring the ejection data. Then, the printing is performed.

Although the ejection trigger signal is output at one raster interval synchronously with the sheet paper conveyance, the data to be ejected may not exist at every raster interval, under the situation that a certain distance exists between heads or rows of nozzles. Therefore, the output control unit 55 judges whether the ejection data corresponding to the timing of the ejection data transfer request from the head module 57 exists or not (Step S2905).

If the corresponding ejection data exists (YES in Step S2905), the output control unit transfers the data (Step S2906). On the other hand, if the corresponding ejection data does not exists (NO in Step S2905), the output control unit 55 transfers the white data which indicates the unnecessity of ejecting (Step S2907).

Thus, in this embodiment, the output control unit 55 rearranges the image data in accordance with the ink ejection order determined depending on the specification of the head module. Thereby, it is possible to provide the printer engine with the improved scalability, and thereby provide the printing device with the improved scalability.

According to the present invention, the scalability is advantageously improved in the printing device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A printing device comprising:
one or more engines that are attachable to and detachable from the printing device and print an image on a recording medium, wherein
the engine includes
a plurality of head modules having a plurality of heads that eject ink;
one or more data transfer control units that control an image data, pixel by pixel, the image data being subjected to print and being transferred from an upper level device via a predetermined path; and
an output control unit that requests the data transfer control unit to transfer the image data in a pixel order in accordance with an ink ejection order determined by the engine mounted on the printing device, transfers the image data having been transferred in the pixel order to the head module, in the same pixel order, that is subjected to eject ink from among the plurality of head modules, and make the head module eject the ink onto the recording medium.

2. The printing device according to claim 1, wherein the ink ejection order is determined in accordance with the number of the head module for one color based on the number of the printer engines.

3. The printing device according to claim 1, wherein the ink ejection order is determined in accordance with a specification of the head module.

4. The printing device according to claim 1, wherein the output control unit switches the pixel order on which the output control unit requests the data transfer control unit to transfer the image data in accordance with the ink ejection order.

5. A printing method performed by a printing device, the printing device having one or more engines that are attachable to and detachable from the printing device and print an image on a recording medium, the engines having a plurality of head modules having a plurality of heads that eject ink, the method comprising:

by one or more data transfer control units, controlling an image data, pixel by pixel, the image data being subjected to print and being transferred from an upper level device via a predetermined path;

by a control unit, requesting the data transfer control unit to transfer the image data in a pixel order in accordance with an ink ejection order determined by the engine mounted on the printing device, transferring the image data having been transferred in the pixel order to the head module, in the same pixel order, that is subjected to eject ink from among the plurality of head modules, and making the head module eject the ink onto the recording medium.

* * * * *